United States Patent
Atsumi

[19]

[11] Patent Number: 5,927,252
[45] Date of Patent: Jul. 27, 1999

[54] IGNITION TIMING CONTROL APPARATUS FOR INTERNAL COMBUSTION ENGINE

[75] Inventor: Yoshiaki Atsumi, Susono, Japan

[73] Assignee: Toyota Jidosha Kabushiki Kaisha, Toyota, Japan

[21] Appl. No.: 08/848,746

[22] Filed: May 1, 1997

[30] Foreign Application Priority Data

May 16, 1996 [JP] Japan .................................. 8-121692

[51] Int. Cl.$^6$ ........................................... F02P 5/15
[52] U.S. Cl. ............................ 123/406.2; 123/406.24; 123/90.15
[58] Field of Search .................. 123/406.2, 406.21, 123/406.24, 406.45, 90.15, 90.17, 90.18, 494

[56] References Cited

U.S. PATENT DOCUMENTS

| | | | |
|---|---|---|---|
| 4,009,695 | 3/1977 | Ule | 123/90.12 |
| 4,257,377 | 3/1981 | Kinugawa et al. | 123/492 |
| 4,452,205 | 6/1984 | Takasu et al. | 123/406.23 |
| 4,498,438 | 2/1985 | Sato | 123/406.63 |
| 4,506,639 | 3/1985 | Murakami et al. | 123/339.11 |
| 4,981,126 | 1/1991 | Kurihara | 123/406.51 |
| 4,996,959 | 3/1991 | Akimoto | 123/406.52 |
| 5,156,126 | 10/1992 | Ohkubo et al. | 123/406.43 |
| 5,284,116 | 2/1994 | Richeson, Jr. | 123/406.2 |
| 5,495,830 | 3/1996 | Wu | 123/90.15 |

FOREIGN PATENT DOCUMENTS

| | | |
|---|---|---|
| A-1-290967 | 11/1989 | Japan . |
| A-5-202783 | 8/1993 | Japan . |

*Primary Examiner*—Tony M. Argenbright
*Assistant Examiner*—Hieu T. Vo
*Attorney, Agent, or Firm*—Oliff & Berridge, PLC

[57] ABSTRACT

An ignition timing control apparatus for an internal combustion engine is disclosed whereby ignition timing is set without incurring deviations from the desired ignition timing even under transient engine operating conditions. For each intake stroke of each cylinder of the engine, the apparatus determines a representative intake air amount value and a representative engine speed value for the intake valve open period of the cylinder, and, based on these values, sets the ignition timing for the combustion stroke associated with the intake stroke. The representative values are the average values of the intake air amounts and engine speeds at the intake valve opening and closing times, or the values of the intake air amount and engine speed obtained at an intermediate point through the intake valve open period. The intake air amount and engine speed at the intake valve closing time and the intake air amount and engine speed at the intermediate point of the intake valve open period may be obtained as values predicted on the basis of the values of the previously detected intake air amount and engine speed so that controllability can be preserved.

5 Claims, 26 Drawing Sheets

Fig.15

MAP FOR SA [°CA-BTDC]
NE [rpm]

| GN [g/rev.] | 800 | 1600 | 2400 | 3200 | --- | 6400 |
|---|---|---|---|---|---|---|
| 0.25 | 20 | 25 | 30 | 30 | --- | 30 |
| 0.50 | 25 | 30 | 40 | 40 | --- | 42 |
| 0.75 | 25 | 35 | 40 | 42 | --- | 42 |
| 1.00 | 20 | 30 | 35 | 42 | --- | 42 |
| 1.25 | 10 | 20 | 30 | 40 | --- | 40 |
| 1.50 | 5 | 12 | 25 | 30 | --- | 35 |
| 1.75 | 2 | 6 | 10 | 20 | --- | 25 |
| 2.00 | 0 | 2 | 5 | 10 | --- | 20 |

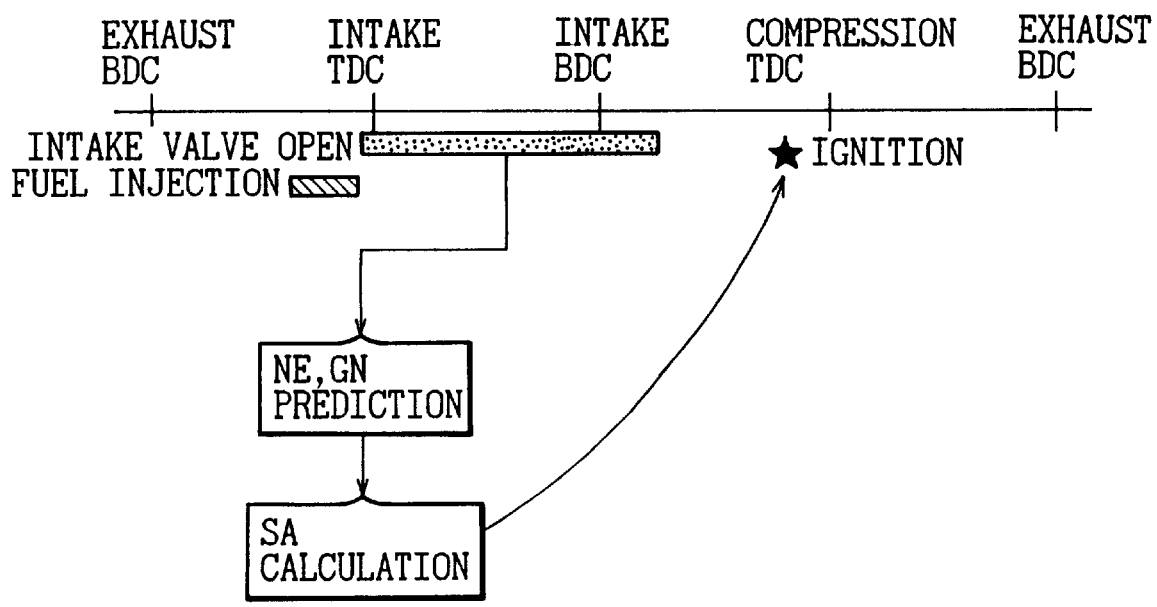

IGNITION TIMING CONTROL APPARATUS FOR INTERNAL COMBUSTION ENGINE

BACKGROUND OF THE INVENTION

1. Field of the Invention

The present invention relates to an apparatus which performs control in an internal combustion engine so that the ignition of compressed air/fuel mixture occurs at an optimum crankshaft angle appropriate to the engine operating condition.

2. Description of the Related Art

Generally, in modern automotive engines, not only fuel injection but also ignition timing are controlled electronically. Electronic control of ignition timing permits precise control of the ignition timing compared to the traditional mechanical control type, and achieves improvements in output performance, fuel economy, emission control performance, etc. Computation of such ignition timing is accomplished by obtaining optimum ignition timing by referring to an ignition timing map based on the engine load (the amount of intake air per engine revolution or some other quantity equivalent to such intake air amount) and engine speed.

One such ignition timing control apparatus is disclosed, for example, in Japanese Patent Unexamined Publication No. 1-290967. The apparatus disclosed therein further involves detecting a transient condition based on the rate of change of throttle angle, and controlling the ignition timing during the transient condition by using a transient ignition timing map predetermined based on data obtained by experiment; in this way, the method of ignition timing calculation is changed between the steady-state and transient operating conditions, attempting to suppress deviations from the optimum ignition timing during transient operating conditions.

Normally it would be desirable that the transient ignition timing thus determined based on experimental data and stored in memory in the electronic control unit be optimum for all engines. In reality, however, there are manufacturing variations among component parts even for engines of the same type, and furthermore, each engine is subject to variations with age; as a result, the stored transient ignition timing is not always optimum, and may, in some cases, depart substantially from the optimum ignition timing.

On the other hand, regarding the timing at which the ignition timing is calculated, there are many engines in which the ignition timing is calculated at fixed intervals of time, regardless of the open/close timing of the intake valve (the timing differs from cylinder to cylinder), and ignition in each cylinder is effected based on the most recent calculated value for that cylinder. Normally the desired ignition timing should be calculated based on the engine speed and the amount of air filled into the cylinder by the opening action of the intake valve. However, the most recent calculated value used to calculate the ignition timing is a value based on the engine speed and the intake air amount at the time of the calculation. With this calculation method, while in the steady-state condition the actual ignition timing agrees with the desired ignition timing, in a transient condition the actual ignition timing tends to deviate from the desired ignition timing.

The difference between the actual intake air amount and the intake air amount used for the calculation of ignition timing becomes pronounced during transient operating conditions such as acceleration or deceleration. During acceleration, the intake air amount (more precisely, the intake air mass per engine revolution [g/rev.]) increases with each combustion. At the same engine speed, combustion speed increases as the intake air amount increases; as a result, the desired ignition timing shifts toward the retard side. For this reason, if the ignition timing is determined based on the intake air amount measured after the intake valve is closed, ignition occurs later than the desired ignition timing, resulting in reduced torque and poor drivability. On the other hand, during deceleration, contrary to acceleration, ignition occurs earlier than the desired ignition timing, tending to cause knocking. This also worsens drivability.

SUMMARY OF THE INVENTION

In view of the above situation, it is an object of the present invention to provide an ignition timing control apparatus that enables ignition timing to be set without causing deviations from the desired ignition timing even under transient engine operating conditions, and thereby achieves an improvement in output performance and prevents engine knock from occurring. It is also an object of the invention to contribute to further improving the drivability of an internal combustion engine.

To achieve the above objects, the basic idea of the invention is to calculate the ignition timing for each combustion stroke of each cylinder on the basis of the intake air amount and engine speed during the intake stroke preceding the combustion stroke.

More specifically, according to a first aspect of the present invention, there is provided an ignition timing control apparatus for an internal combustion engine, which comprises: intake air amount detection means for detecting the amount of intake air drawn into the engine; engine speed detection means for detecting the rotational speed of the engine; and ignition timing setting means for determining, for each intake stroke of each cylinder of the engine, a representative intake air amount value and a representative engine speed value for the intake valve open period of the cylinder on the basis of the value of the intake air amount detected by the intake air amount detection means and the value of the engine speed detected by the engine speed detection means, and for setting ignition timing for a combustion stroke associated with the intake stroke on the basis of the representative intake air amount value and the representative engine speed value.

According to a second aspect of the invention, preferably, the representative intake air amount value is an average value taken between the intake air amounts at intake valve opening and closing times, and the representative engine speed value is an average value taken between the engine speeds at the intake valve opening and closing times.

According to a third aspect of the invention, preferably, the representative intake air amount value represents the intake air amount at an intermediate point of the intake valve open period, and the representative engine speed value represents the engine speed at the intermediate point of the intake valve open period.

According to a fourth aspect of the invention, preferably, the intake air amount and engine speed at the intake valve closing time are given as values predicted on the basis of the values of the intake air amount and engine speed previously detected by the intake air amount detection means and the engine speed detection means.

According to a fifth aspect of the invention, preferably, the intake air amount and engine speed at the intermediate point of the intake valve open period are given as values predicted on the basis of the values of the intake air amount and engine speed previously detected by the intake air amount detection means and the engine speed detection means.

BRIEF DESCRIPTION OF THE DRAWINGS

Further features and advantages of the present invention will be apparent from the following description with reference to the accompanying drawings, in which;

FIG. 15 is a diagram showing a map used to obtain ignition timing SA according to engine speed NE and intake air amount GN;

FIG. 25 is a diagram for explaining ignition timing control according to a fourth embodiment.

DESCRIPTION OF THE PREFERRED EMBODIMENTS

The basic principle of ignition timing control according to the present invention will be described first.

Figure 1:
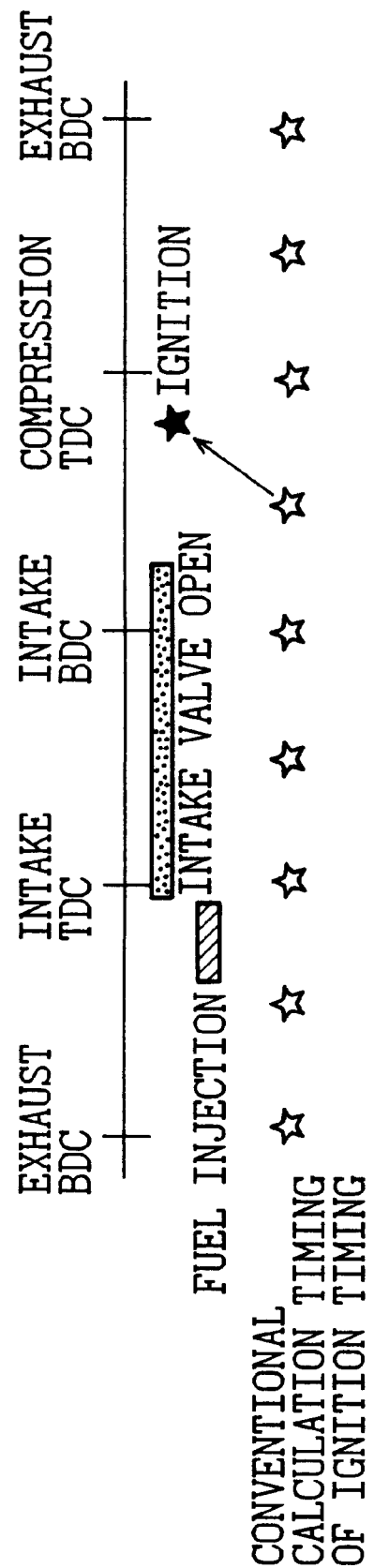
FIG. 1 is a diagram showing the relationship between piston position, fuel injection timing, intake valve open/close timing, and ignition timing calculation timing in a conventional engine.

FIG. 1 is a diagram showing the relationship between the piston position, fuel injection timing, intake valve open/close timing, and ignition timing calculation timing in a conventional engine in which the ignition timing is calculated at fixed intervals of time, regardless of the open/close timing of the intake valve (the timing differs from cylinder to cylinder), and ignition in each cylinder is effected based on the most recent calculated value for that cylinder. Normally the desired ignition timing should be calculated based on the engine speed and the amount of air filled into the cylinder by the opening action of the intake valve. However, the most recent calculated value used to calculate the ignition timing is a value based on the engine speed and the intake air amount at the time of the calculation. With this calculation method, while in the steady-state condition the actual ignition timing agrees with the desired ignition timing, in a transient condition the actual ignition timing tends to deviate from the desired ignition timing. More specifically, a situation can occur where, though the intake valve of the cylinder is closed and the cylinder air amount is determined, a new ignition timing is calculated and ignition is effected at that timing.

Figure 2:
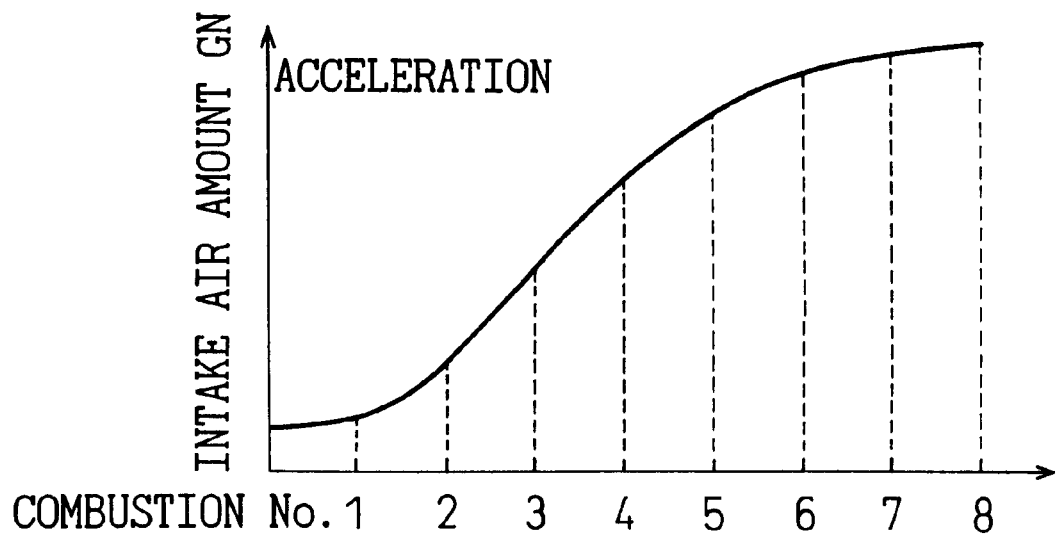
FIG. 2 is a diagram showing how the amount of intake air (more precisely, intake air mass per engine revolution [g/rev.]) GN changes with each combustion during acceleration.
Figure 3:
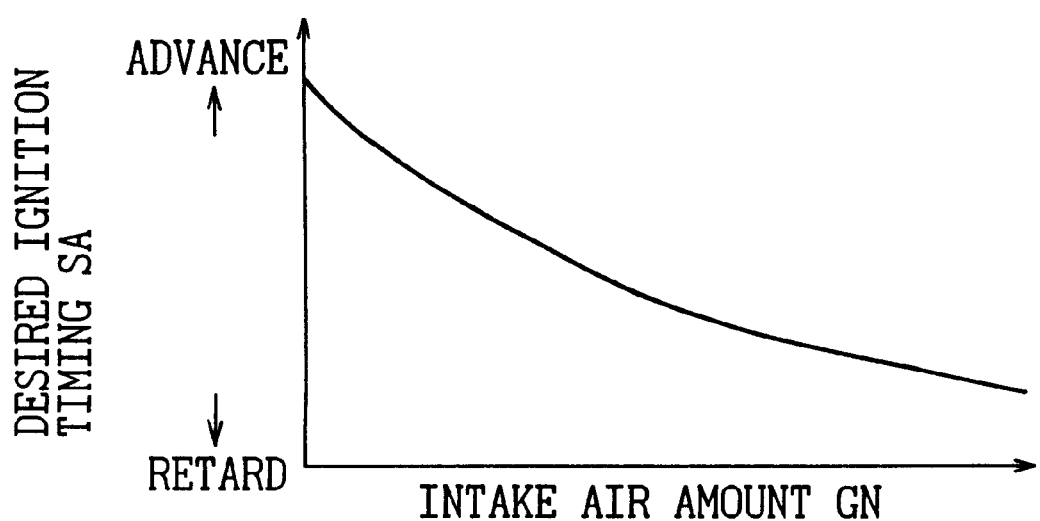
FIG. 3 is a characteristic diagram showing the relationship between the intake air amount and the desired ignition timing (numeric value corresponding to the degrees of crankshaft rotation measured backward from top dead center—spark advance value [°CA-BTDC]) SA at the same engine speed.

The difference between the actual intake air amount and the intake air amount used for the calculation of ignition timing becomes pronounced during transient operating conditions such as acceleration or deceleration. FIG. 2 is a diagram showing how the intake air amount (more precisely, intake air mass per engine revolution [g/rev.]) GN changes with each combustion during acceleration; as shown, GN during acceleration increases with each combustion. FIG. 3 is a characteristic diagram showing the relationship between the intake air amount and the desired ignition timing (numeric value corresponding to the degrees of crankshaft rotation measured backward from top dead center—spark advance value [°CA-BTDC]) SA at the same engine speed. At the same engine speed, combustion speed increases as the intake air amount GN increases; as a result, the desired ignition timing SA shifts toward the retard side, as shown in FIG. 3. For this reason, if the ignition timing is determined based on the intake air amount GN measured after the intake valve is closed, ignition occurs later than the desired ignition timing, resulting in reduced torque and bad drivability. On the other hand, during deceleration, contrary to acceleration, ignition occurs earlier than the desired ignition timing, tending to cause knocking. This also worsens drivability.

In an ignition timing control apparatus according to a first aspect of the present invention, ignition timing for each cylinder is determined using a representative intake air amount value and a representative engine speed value for the intake valve open period of that cylinder. As a result, the situation does not occur where the ignition timing is set based on the intake air amount and engine speed detected after the intake value of the cylinder is closed, that is, after the intake air amount has been determined. This contributes to reducing the amount of deviation from the desired ignition timing.

Figure 4:
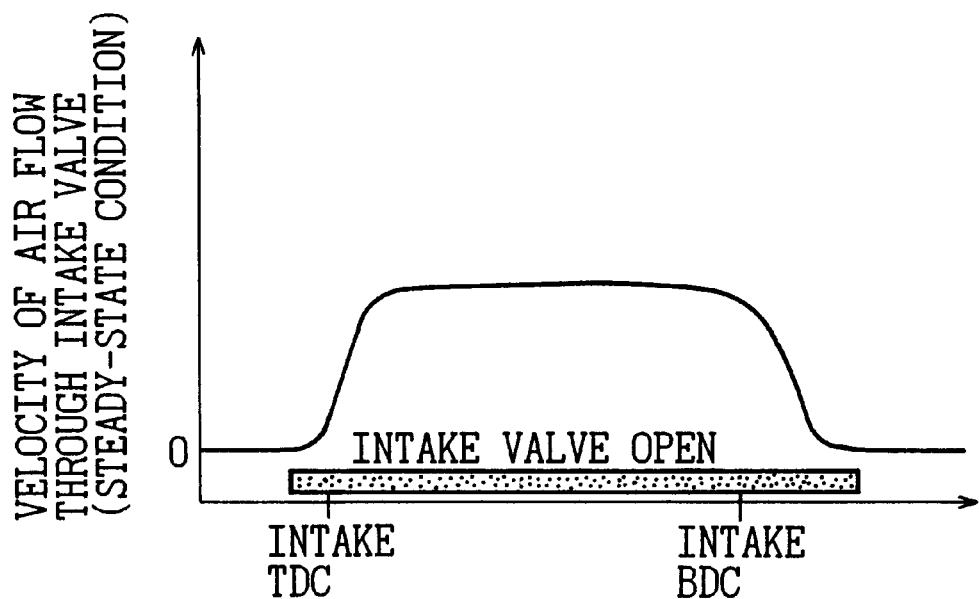
FIG. 4 is a diagram showing the relationship between the piston position and the velocity of air flow passing through the intake valve under steady-state operating conditions.
Figure 5:
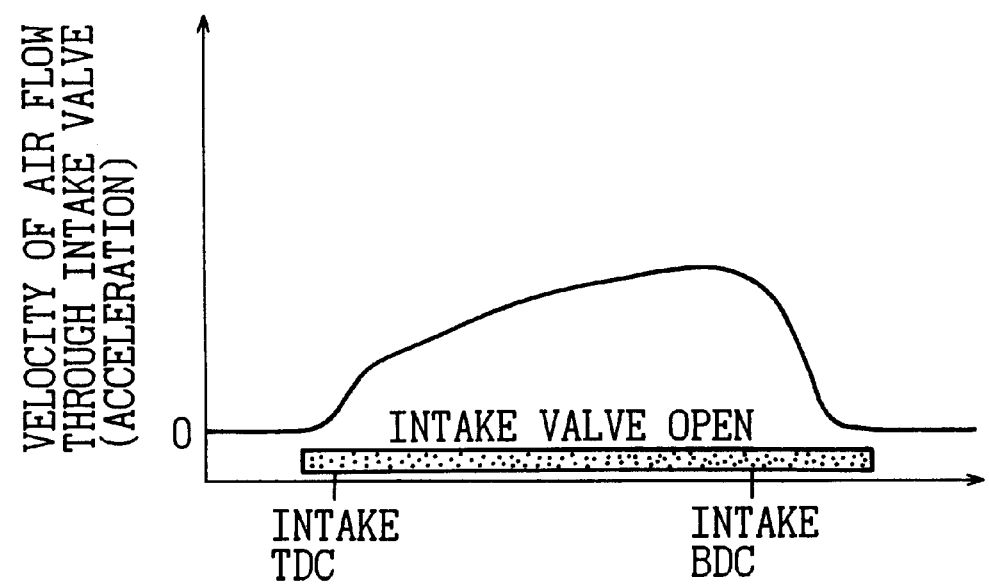
FIG. 5 is a diagram showing the relationship between the piston position and the velocity of air flow passing through the intake valve in a transient operating condition (acceleration)

At steady-state operating conditions, air is filled into the cylinder at a nearly constant flow velocity during the intake valve open period, as shown in FIG. 4. On the other hand, at transient engine operating conditions, the flow velocity changes between the times of opening and closing of the intake valve, as illustrated in FIG. 5 which shows an example of acceleration mode. In an apparatus according to a second aspect of the present invention, the representative values of the intake air amount and engine speed are each detected precisely and in a simple manner as an average value taken between the values at the intake valve opening and closing times.

Further, the intake air amount and engine speed at an intermediate point through the intake valve open period can be considered to provide values close to the average values during the intake valve open period. In an apparatus according to a third aspect of the present invention, the intake air amount and engine speed at such an intermediate point are taken as the representative values of the respective quantities. This reduces the computational burden and increases the speed of ignition timing calculation, compared to the apparatus according to the second aspect of the present invention. The result is improved controllability.

At high engine speeds, the time interval between the calculation of ignition timing and the initiation of ignition becomes short, giving rise to the possibility that sufficient time cannot be secured to charge the ignition system. In an apparatus according to a fourth or fifth aspect of the present invention, the intake air amount and engine speed at the intake valve closing time, as obtained in the apparatus according to the second aspect of the present invention, or the intake air amount and engine speed at an intermediate point through the intake air open period, as obtained in the apparatus according to the third aspect of the present invention, are calculated swiftly as predicted values, so that controllability can be maintained at high engine speeds.

Figure 6:
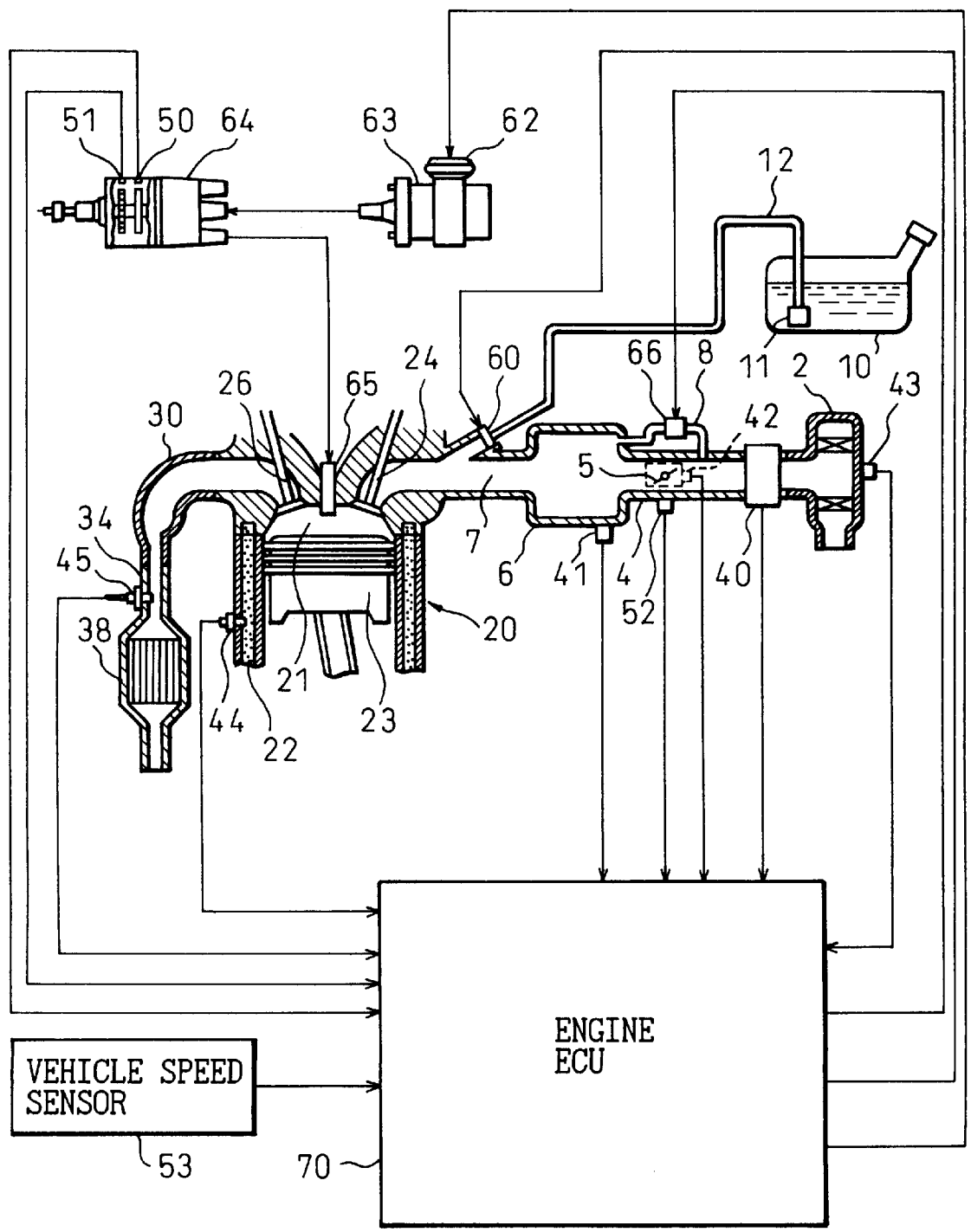
FIG. 6 is a schematic diagram showing the general construction of an electronically controlled internal combustion engine equipped with an ignition timing control apparatus according to one embodiment of the present invention.

FIG. 6 is a schematic diagram showing the general construction of an electronically controlled internal combustion engine equipped with an ignition timing control apparatus according to one embodiment of the present invention. Air necessary for combustion in the engine is filtered through an air cleaner 2, and introduced through a throttle body 4 into a surge tank (intake manifold) 6 for distribution to an intake pipe 7 of each cylinder. The flow rate of the intake air is measured by an air flow meter 40, and is regulated by a throttle valve 5 provided in the throttle body 4. Intake air temperature is detected by an intake air temperature sensor 43. Further, intake manifold pressure is detected by a vacuum sensor 41.

The opening angle of the throttle valve 5 is detected by a throttle angle sensor 42. When the throttle valve 5 is in its fully closed position, an idle switch 52 is turned on, and its output as a throttle full-close signal is set active. An idle speed control valve (ISCV) 66 for adjusting the air flow rate during idling is installed in an idle adjust passage 8 that bypasses the throttle valve 5.

On the other hand, the fuel stored in a fuel tank 10 is drawn by a fuel pump 11, passes through a fuel pipe 12, and is injected into the intake pipe 7 through a fuel injector valve 60.

The air and fuel are mixed together in the intake pipe 7, and the mixture is drawn through an intake valve 24 into a combustion chamber 21 of a cylinder 20, that is, into the engine body. In the combustion chamber 21, the air-fuel mixture is first compressed by a piston 23, and then ignited and burned causing a rapid pressure rise and thus producing power. To accomplish the ignition, an ignition signal is applied to an igniter 62, which controls the supply and cutoff of a primary current to an ignition coil 63, and the resulting secondary current is supplied to a spark plug 65 by an ignition distributor 64.

The ignition distributor 64 is provided with a reference position detection sensor 50 which generates a reference position detection pulse for every 720° CA rotation of its shaft measured in degrees of crankshaft angle (CA), and a crankshaft angle sensor 51 which generates a position detection pulse for every 30° CA. Actual vehicle speed is detected by a vehicle speed sensor 53 that produces output pulses representing the vehicle speed. The engine 20 is cooled by a coolant introduced into a coolant passage 22, and the coolant temperature is detected by a coolant temperature sensor 44.

The burned air-fuel mixture as exhaust gas flows past an exhaust valve 26 into an exhaust manifold 30, and then is introduced into an exhaust pipe 34. In the exhaust pipe 34 is mounted an $O_2$ sensor 45 which detects oxygen concentration in the exhaust gas. In the exhaust system further downstream, there is mounted a catalytic converter 38 which contains a three-way catalyst for simultaneously promoting the oxidation of unburned constituents (HC and CO) and the reduction of nitrogen oxides ($NO_x$) contained in the exhaust gas. The exhaust gas thus purified in the catalytic converter 38 is discharged into the atmosphere.

Figure 7:
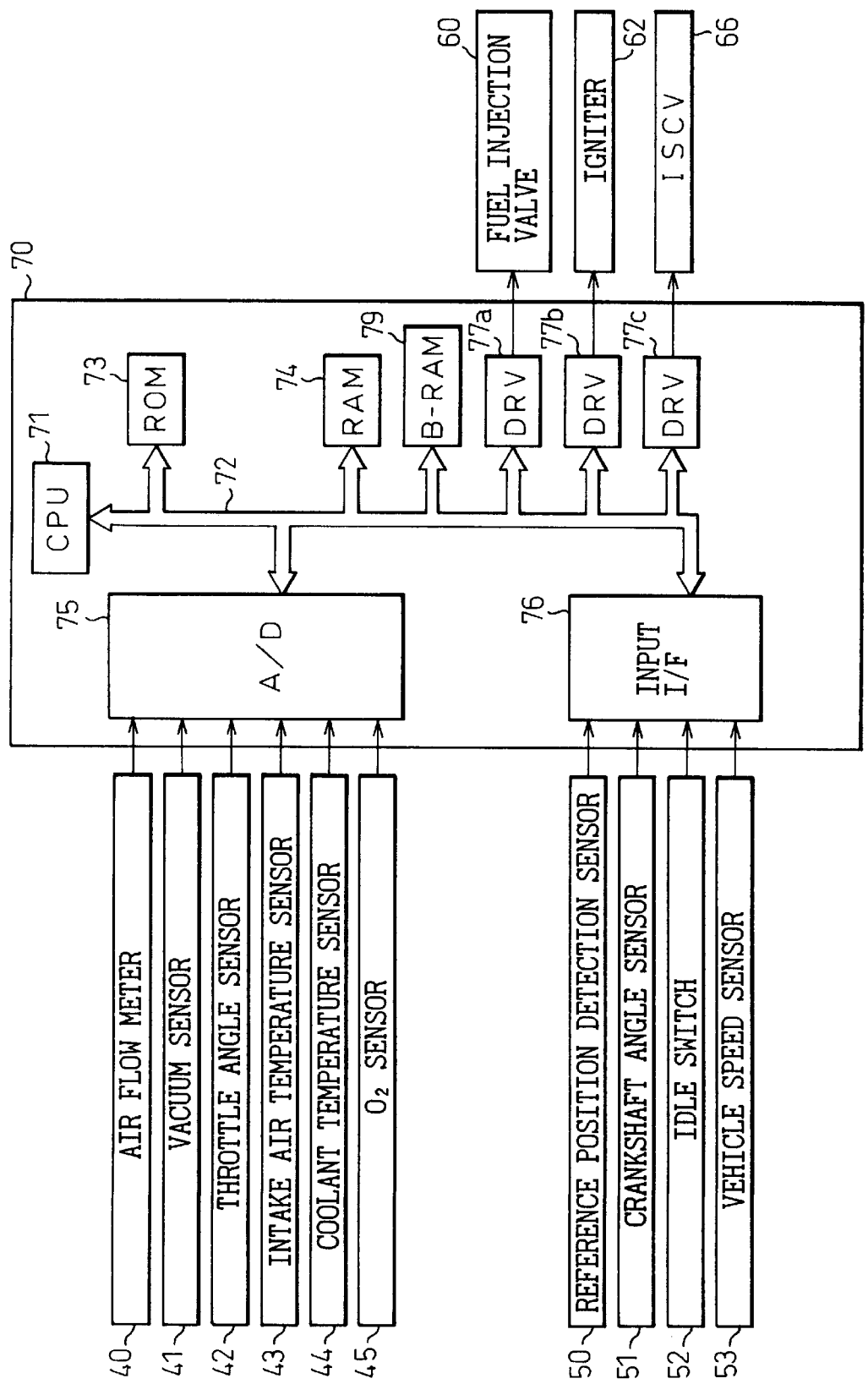
FIG. 7 is a block diagram showing the hardware configuration of an engine ECU according to one embodiment of the present invention.

An engine electronic control unit (engine ECU) 70 is also shown which is a microcomputer system that performs fuel injection control, ignition timing control, idle speed control, etc. The hardware configuration is shown in the block diagram of FIG. 7. Signals from the various sensors and switches are input via an A/D conversion circuit 75 or via an input interface circuit 76 to a central processing unit (CPU) 71 which, in accordance with programs and various maps stored in a read-only memory (ROM) 73, performs arithmetic operations using the input signals, and based on the results of the operations, outputs control signals for the various actuators via respective drive control circuits 77a–77c. A random-access memory (RAM) 74 is used to temporarily store data during the arithmetic operation and control processes. A backup RAM 79 is supplied with power from a battery (not shown) directly connected to it, and is used to store data (such as various learning values) that should be retained when the ignition switch is off. These constituent parts of the ECU are interconnected by a system bus 72 consisting of an address bus, a data bus, and a control bus.

Figure 8:
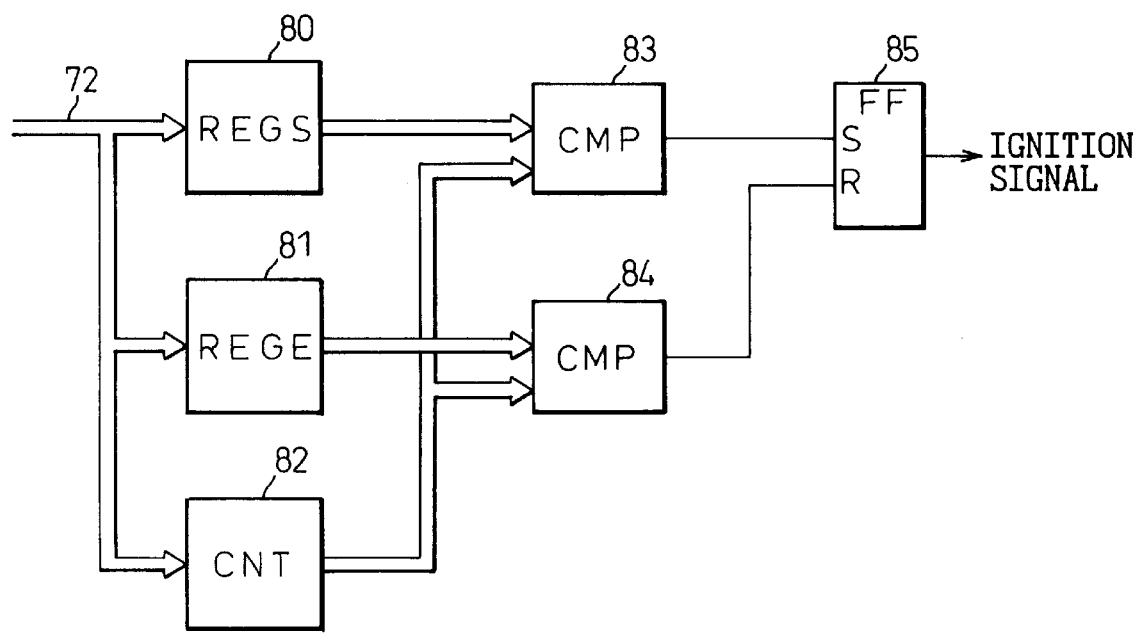
FIG. 8 is a block diagram showing one configurational example of a drive control circuit for an igniter.

FIG. 8 is a block diagram showing a configurational example of the drive control circuit 77b for the igniter 62. Reference numeral 80 is a register (REGS) for storing charging start timing data supplied through the system bus 72, and 81 is a register (REGS) for storing charging shutoff timing data, i.e., ignition timing data, supplied through the system bus 72. Reference numeral 82 is a counter (CNT), implemented in hardware, that counts up on a clock signal not shown. The counter 82 is capable of being initialized through the system bus 72. Further, reference numeral 83 is a comparator (CMP) which compares the contents of the register 80 with the contents of the counter 82, and which outputs an active signal when they match, and reference numeral 84 is a comparator (CMP) which compares the contents of the register 81 with the contents of the counter 82, and which outputs an active signal when they match. Reference numeral 85 is a flip-flop (FF) which is set based on the output signal of the comparator 83 and is reset based on the output signal of the comparator 84. The output signal of the flip-flop 85 is the ignition signal supplied to the igniter 62. The CPU 71 can create the desired ignition timing by storing the charging start timing data and charging shutoff timing (ignition timing) data in the registers 80 and 81 and initializing the counter 82.

A description will now be given of the engine control process performed by the ECU 70 for the internal combustion engine having the above-described hardware configuration.

Basically, fuel injection control involves computing the fuel injection amount, that is, the time the fuel injector valve 60 is open, that achieves the desired target air-fuel ratio on the basis of the intake air amount per engine revolution, and controlling the fuel injector valve 60 via the drive control circuit 77a so that fuel is injected at the time instant that the prescribed crankshaft angle is reached. Here, the intake air amount per engine revolution is either computed from the intake air flow rate measured by the air flow meter 40 and the engine speed obtained from the crankshaft angle sensor 51, or estimated from the engine speed and the intake pipe pressure obtained from the vacuum sensor 41. In the above fuel injection amount computation, corrections are made, such as basic corrections based on signals from the throttle angle sensor 42, intake air temperature sensor 43, coolant temperature sensor 44, etc., an air-fuel ratio feedback correction based on a signal from the $O_2$ sensor 45, and an air-fuel ratio learning correction to bring the median of the feedback correction value to stoichiometry.

In idle speed control, an idle state is detected based on the throttle full-close signal from the idle switch 52 and the vehicle speed signal from the vehicle speed sensor 53, and actual engine speed is compared with the target engine speed that is determined from such quantities as the engine coolant temperature from the coolant temperature sensor 44; based on the obtained difference, the amount of control is determined so as to achieve the target engine speed, and the amount of air is adjusted by controlling the ISCV 66 via the drive control circuit 77c, thereby maintaining optimum idle speed.

In ignition timing control, the engine condition is comprehensively judged based on the engine speed obtained from the crankshaft angle sensor 51, the intake air amount obtained from the air flow meter 40, and signals from other sensors, optimum ignition timing is determined, and an ignition signal is sent to the igniter 62 via the drive control circuit 77b. Hereinafter, the ignition timing control according to the present invention will be described in detail.

Figure 9:
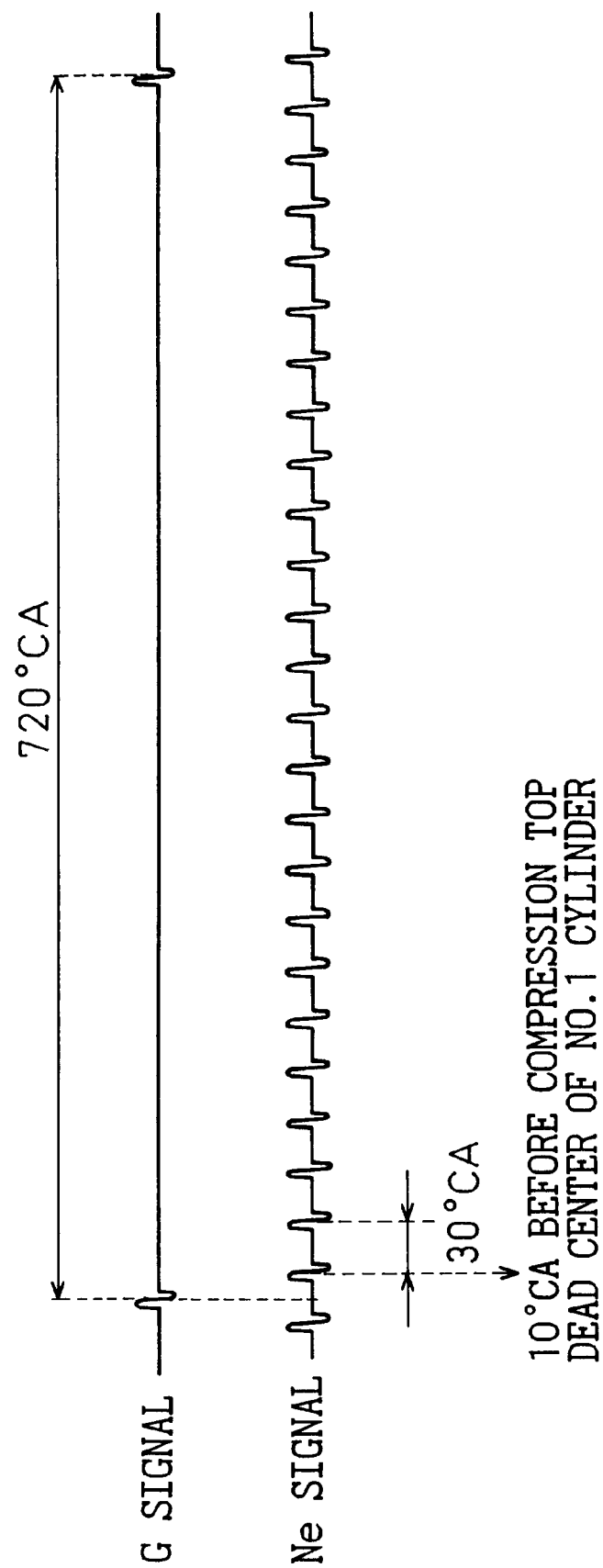
FIG. 9 is a diagram showing the waveforms of a reference position detection sensor output signal (G signal) and a crankshaft angle sensor output signal (Ne signal) during two engine revolutions.

The present invention is concerned with the timing of calculation of ignition timing, as previously described, and performs processing synchronized to engine rotation. FIG. 9 is a diagram showing the waveforms of the signal (G signal) from the reference position detection sensor 50 and the signal (Ne signal) from the crankshaft angle sensor 51 during two engine revolutions; these signals provide the basis for the processing as illustrated in the present embodiment. The G signal provides a pulse for every 720° CA, while the Ne signal outputs pulses at intervals of 30° CA. The setting is such that the first pulse of the Ne signal that comes after a pulse of the G signal represents 10° CA before compression top dead center for the No. 1 cylinder.

Figure 10:
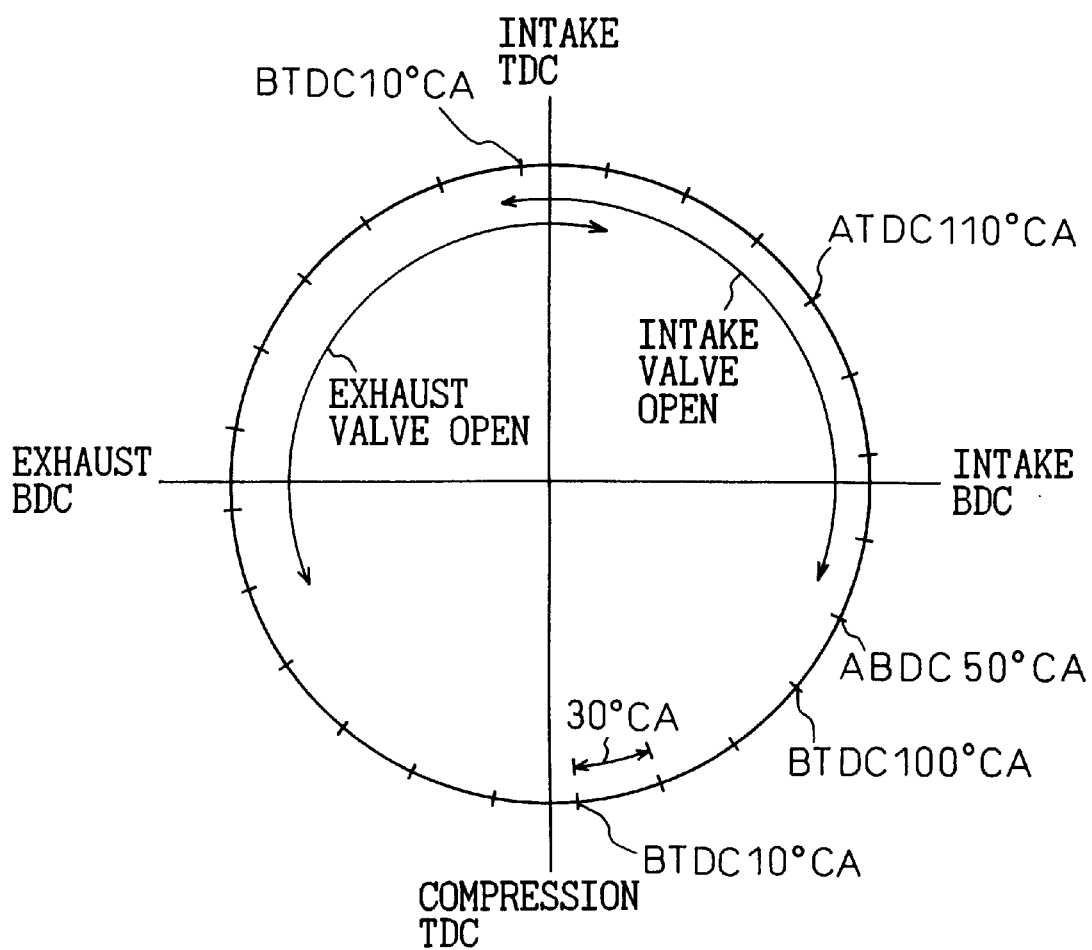
FIG. 10 is a valve timing diagram showing the open/close timings of the intake valve and exhaust valve as expressed in degrees of crankshaft rotation.

FIG. 10 is a valve timing diagram showing the open/close timings of the intake valve 24 and exhaust valve 26 as expressed in degrees of crankshaft rotation. In this figure, the marks spaced 30° CA apart around the circumference each indicate the timing at which the Ne signal outputs a pulse. In the present embodiment, the intake valve open timing is fixed to 5° CA before intake top dead center (intake TDC), while the intake valve close timing is fixed to 40° CA after intake bottom dead center (intake BDC). The ignition timing is calculated as the number of degrees of crankshaft rotation before compression top dead center (spark advance value [°CA-BTDC]), and this value is set in the drive control circuit 77b along with the charging start timing value when 100° CA before compression top dead center is reached. Here, in the present embodiment, the intake valve open timing is fixed to 5° CA before intake top dead center (intake TDC), and the intake valve close timing to 40° CA after intake bottom dead center (intake BDC), but these values need not necessarily be fixed, but may be varied adaptively in accordance with the engine operating condition. Further, the charging time used here is expressed in terms of the crankshaft angle converted from the time required for charging determined according to the engine operating condition. Also note that the present embodiment assumes a four-cylinder engine, and therefore that the action as shown in FIG. 10 is displaced 180° CA between each cylinder. Four embodiments will be described below.

Figure 11:
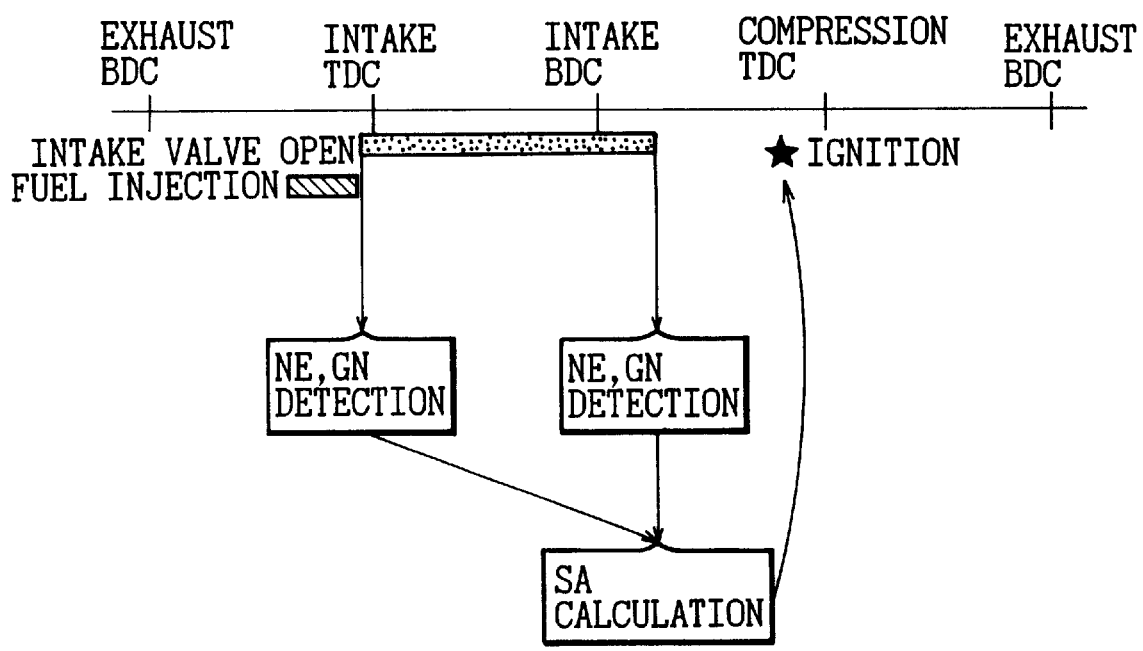
FIG. 11 is a diagram for explaining ignition timing control according to a first embodiment.

In the first embodiment, as shown in FIG. 11, the intake air amount GN and the engine speed NE are detected at the timing of opening and closing of the intake valve for each intake stroke of each cylinder, and the ignition timing SA is determined based on the average intake air amount and average engine speed calculated from the detected values. In this embodiment, the GN and NE are detected at 10° CA before intake top dead center, which is the Ne signal pulse generating timing nearest to the intake valve open timing (5° CA before intake top dead center), and at 50° CA after intake bottom dead center, which is the Ne signal pulse generating timing nearest to the intake valve close timing (40° CA after intake bottom dead center). Processing routines for this embodiment will be described below.

Figure 12:
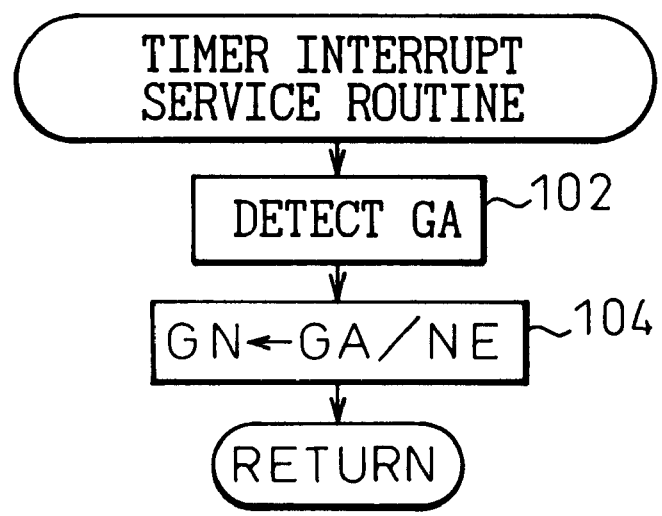
FIG. 12 is a flowchart illustrating a processing sequence for a timer interrupt service routine according to the first embodiment.

FIG. 12 is a flowchart illustrating a processing sequence for a timer interrupt service routine which is invoked by a prescribed timer interrupt. This routine is therefore executed at prescribed intervals of time. First, intake air flow rate (mass) GA is detected based on the output of the air flow meter 40 (step 102). Next, using the GA and the engine speed NE which is separately calculated by an Ne signal interrupt service routine described later, the calculation $$GN \leftarrow GA/NE$$

is performed to calculate the intake air amount (mass) GN per engine revolution (step 104). In this way, the most recent value for the intake air amount GN is calculated at prescribed intervals of time.

Figure 13:
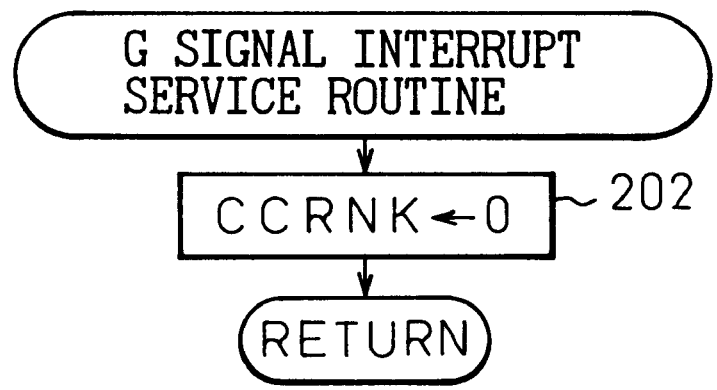
FIG. 13 is a flowchart illustrating a processing sequence for a G signal interrupt service routine according to the first embodiment.

FIG. 13 is a flowchart illustrating a processing sequence for a G signal interrupt service routine which is invoked for every 720° CA, that is, for every pulse of the G signal. This routine only performs processing to initialize a crankshaft angle calculation counter CCRNK to 0 (step 202).

Figure 14A:
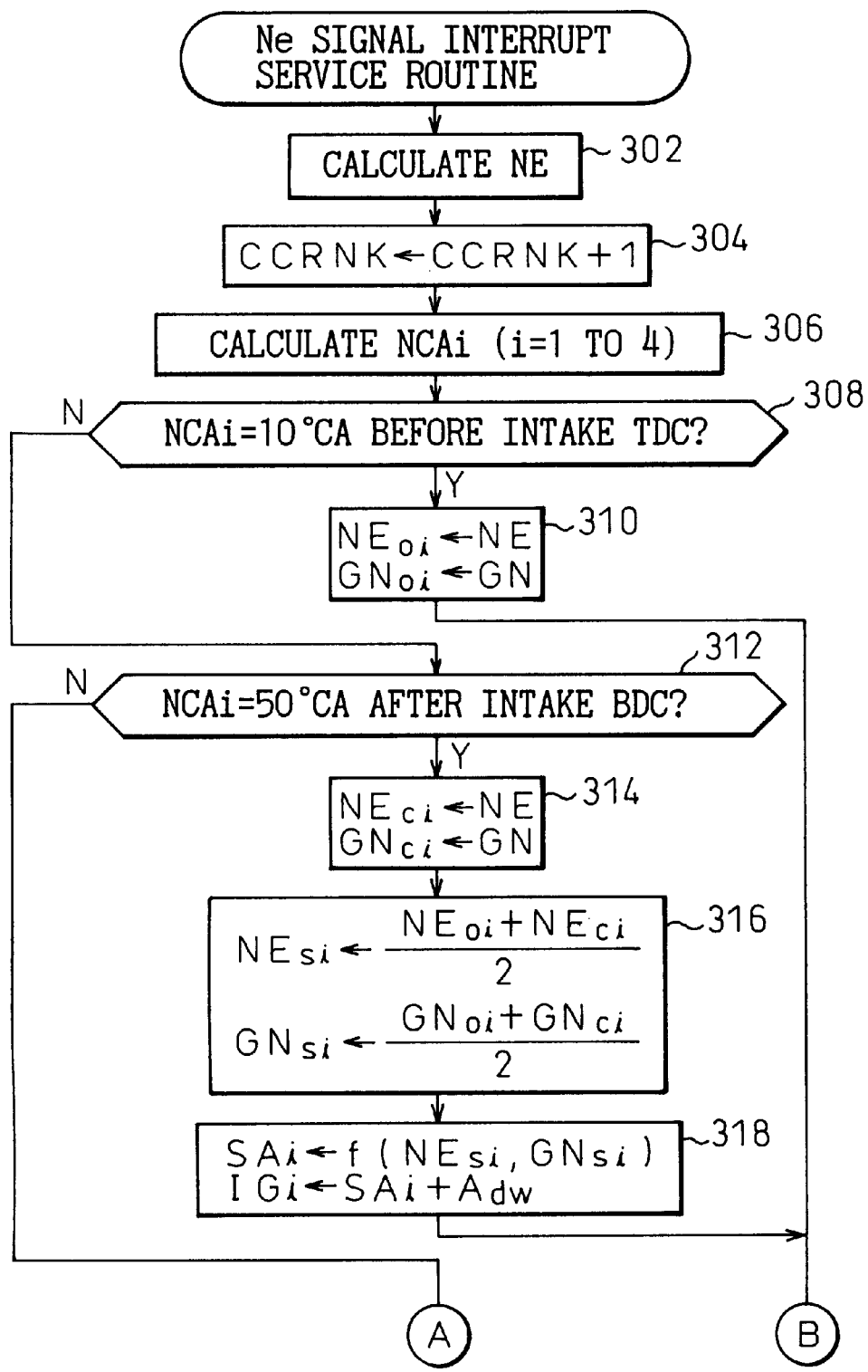
FIGS. 14A and 14B are diagrams showing a flowchart illustrating a processing sequence for an Ne signal interrupt service routine according to the first embodiment.
Figure 14B:
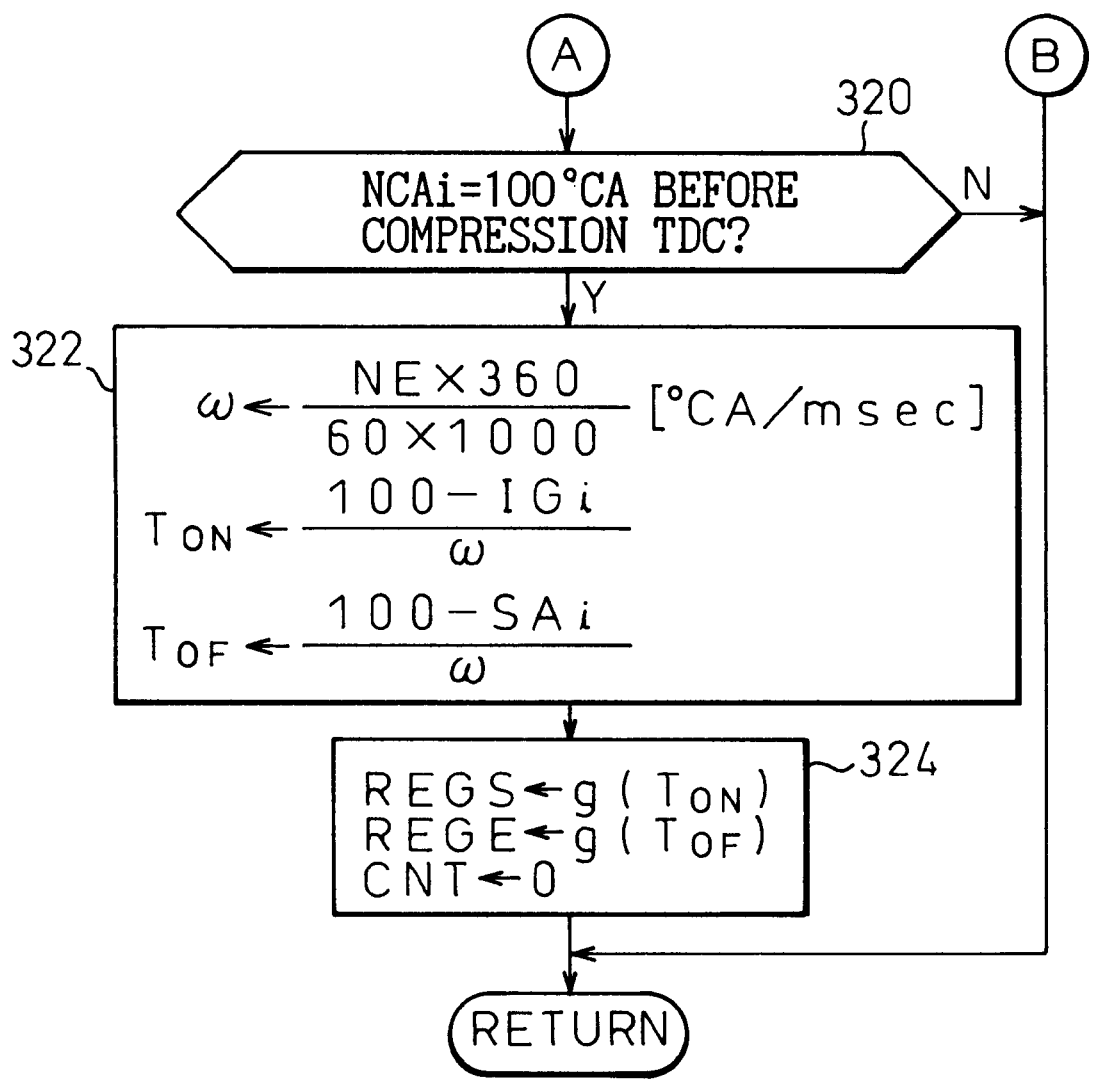

FIGS. 14A and 14B show a flowchart illustrating the Ne signal interrupt service routine which is invoked for every 30° CA, that is, for every pulse of the Ne signal. In this routine, first the present engine speed NE (unit: rpm) is calculated based on the pulse generation interval of the Ne signal (step 302). This NE calculation can be implemented in either hardware or software. Next, the crankshaft angle calculation counter CCRNK is incremented (step 304). Then, the present crankshaft angles NCA1 to NCA4 for the No. 1 to No. 4 cylinders are calculated based on the value of the CCRNK (step 306). When CCRNK=1, for example, NCA1 for the No. 1 cylinder is 10° CA before compression top dead center, as previously described, and NCA2 to NCA4 for the No. 2 to No. 4 cylinders are displaced from that angle by 180° CA×n.

Next, a decision is made as to whether any one of the thus calculated crankshaft angles NCAi (i=1, 2, 3, 4) is at 10° CA before intake top dead center (step 308). If the answer to the decision is YES, the process proceeds to step 310; if the answer is NO, the process proceeds to step 312. In step 310, the present engine speed NE and intake air amount GN are stored as the engine speed NEoi and intake air amount GNoi obtained at the intake valve opening time for the No. i cylinder, and the routine is terminated. In step 312, a decision is made as to whether any NCAi is at 50° CA after intake bottom dead center; if the answer to the decision is YES, the process proceeds to step 314, but if the answer is NO, the process proceeds to step 320. In step 314, the present engine speed NE and intake air amount GN are stored as the engine speed NEci and intake air amount GNci obtained at the intake valve closing time for the No. i cylinder, after which the process proceeds to step 316.

In step 316, the calculations

NEsi←(NEoi+NEci)/2

GNsi←(GNoi+GNci)/2 are performed to calculate the respective average values. In the next step 318, the ignition timing (spark advance value before compression top dead center) SAi for the No. i cylinder is obtained by referring to a map such as shown in FIG. 15, based on the average values NEsi and GNsi, and the calculation IGi←SAi+$A_{dw}$ is performed to calculate the charging start timing. Here, $A_{dw}$ indicates the charging time which, as previously noted, is expressed in terms of the crankshaft angle converted from the time required for charging determined according to the engine operating condition (such as steady-state or transient operating condition). The map 15 shown in FIG. 15 and the maps used in the following description are prestored in the ROM 73. After carrying out step 318, the routine is terminated.

In step 320, which is carried out when the answer to the decision in step 312 is NO, a decision is made as to whether any one of the crankshaft angles NCAi (i=1, 2, 3, 4) is at 100° CA before compression top dead center; if the answer to the decision is NO, the routine is terminated, but if the answer is YES, the process proceeds to step 322. In step 322, the calculation

ω←NE×360/60×1000 is performed to calculate the angle of crankshaft rotation, ω, per millisecond. Further, the calculations $T_{ON}$←(100−IGi)/ω

$T_{OF}$←(100−SAi)/ω are performed to calculate the time $T_{ON}$ from the present time instant (100° CA before compression top dead center) to the charging start timing and the time $T_{OF}$ from the present time instant to the charging shutoff timing (ignition timing).

In the next step 324, the following processing is performed.

REGS←g($T_{ON}$)

REGS←g($T_{OF}$)

CNT←0

That is, $T_{ON}$ and $T_{OF}$ are each converted to a value corresponding to the number of clocks input to the hardware counter 82 (FIG. 8), and are placed in the registers 80 (REGS) and 81 (REGS), and the counter 82 is initialized. With this processing, ignition in the No. i cylinder occurs at the desired time.

Figure 16:
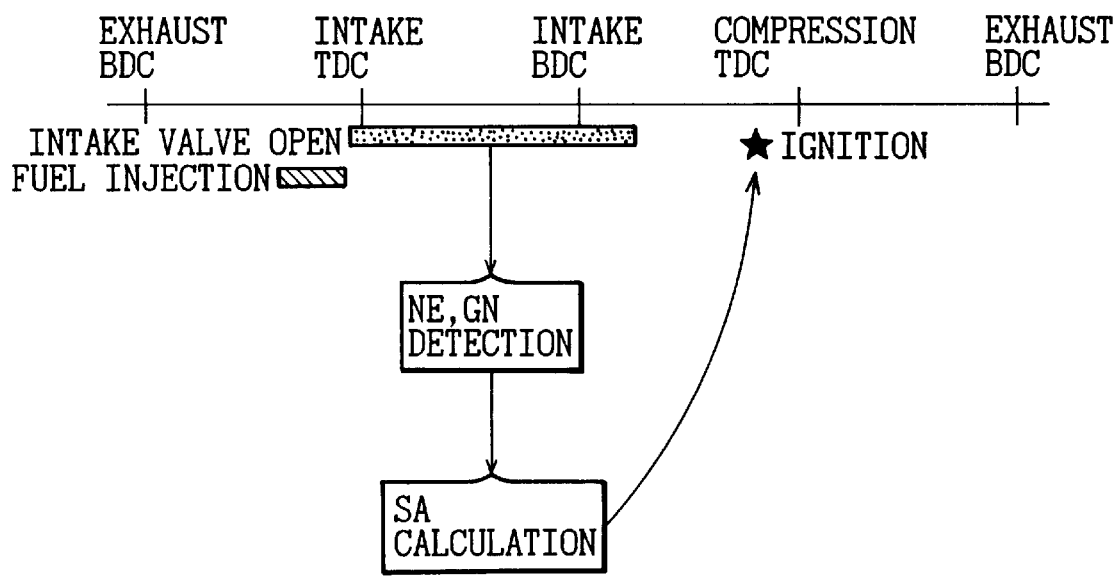
FIG. 16 is a diagram for explaining ignition timing control according to a second embodiment.

The second embodiment will be described next. In the second embodiment, as shown in FIG. 16, the intake air amount GN and the engine speed NE are detected at an intermediate point through the intake valve open period, and the ignition timing SA is determined based on the detected values. In this embodiment, the GN and NE are detected at 110° CA after intake top dead center, which is the Ne signal pulse generating timing nearest to the intermediate point of the intake valve open period. The second embodiment differs from the first embodiment only in the Ne signal interrupt service routine, and the other routines are the same as those in the first embodiment.

Figure 17A:
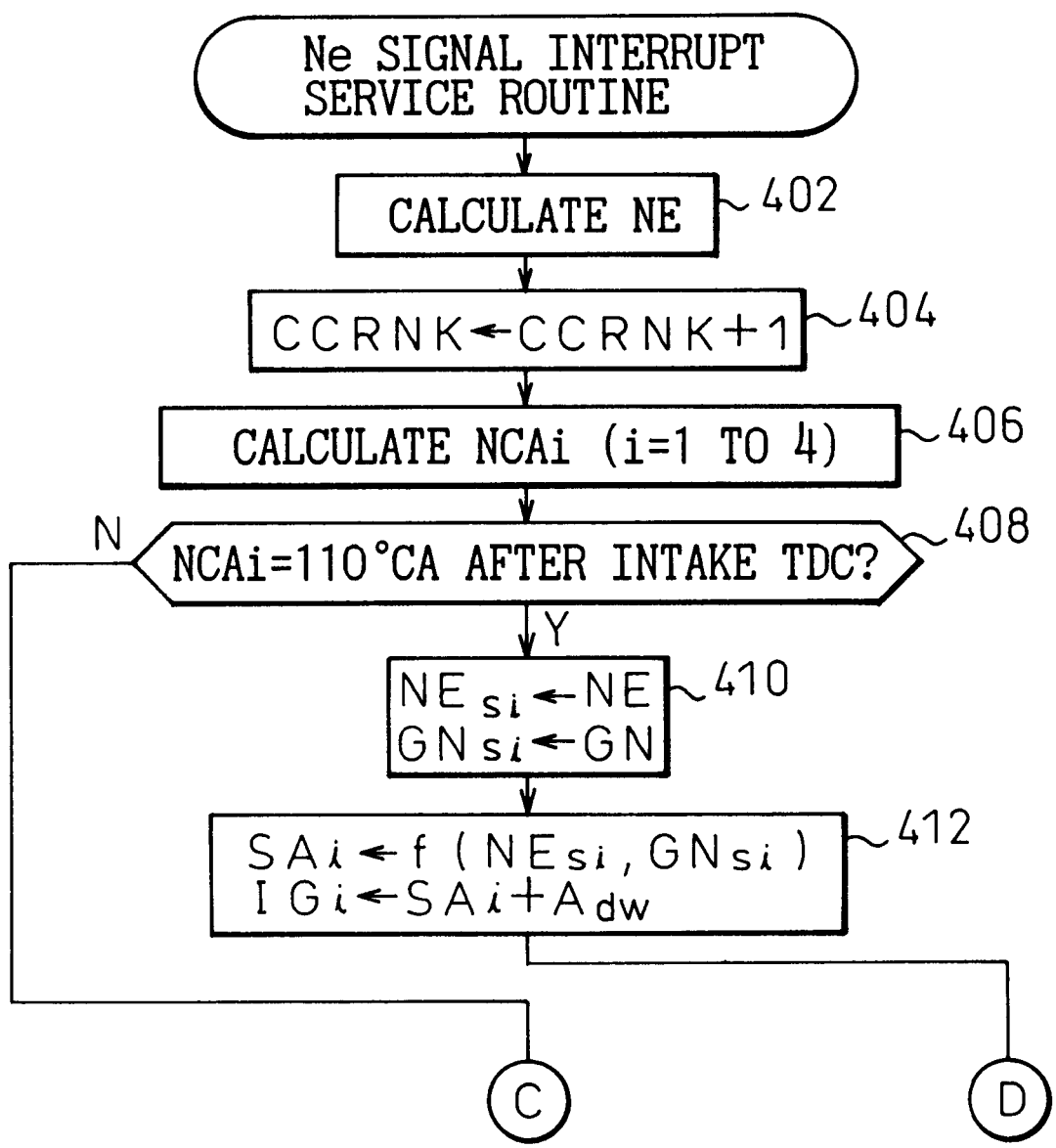
FIGS. 17A and 17B are diagrams showing a flowchart illustrating a processing sequence for an Ne signal interrupt service routine according to the second embodiment.
Figure 17B:
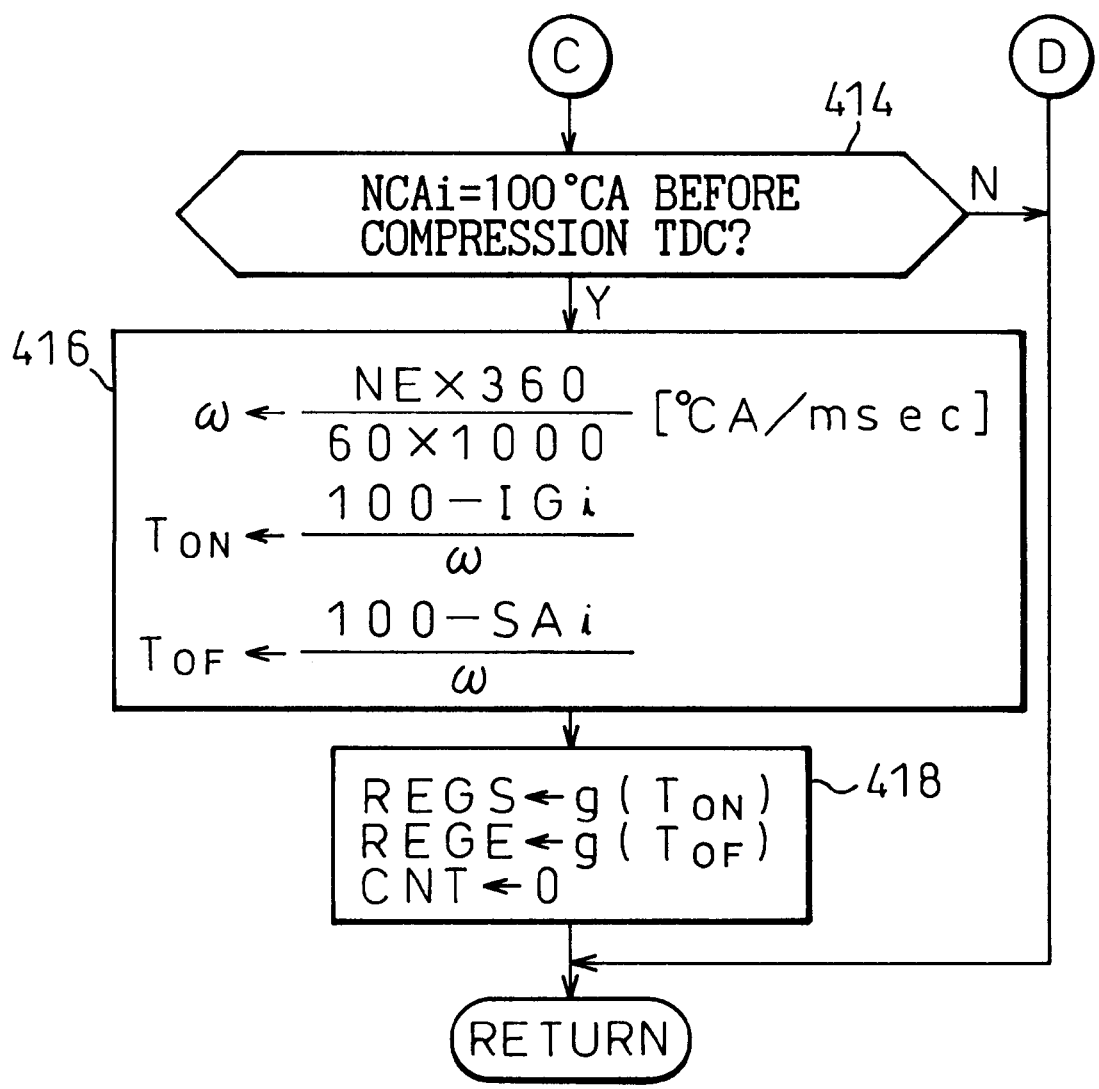

FIGS. 17A and 17B show a flowchart illustrating a processing sequence for the Ne signal interrupt service routine according to the second embodiment. First, in steps 402, 404, and 406, the present engine speed NE is calculated, the crankshaft angle calculation counter CCRNK is incremented, and the crankshaft angles NCAi (i=1, 2, 3, 4) are calculated for the respective cylinders, in the same manner as in steps 302, 304, and 306 in the Ne signal interrupt service routine according to the first embodiment.

Next, in step 408, a decision is made as to whether any one of the crankshaft angles NCAi is at 110° CA after intake top dead center; if the answer to the decision is YES, the process proceeds to step 410, but if the answer is NO, the process proceeds to step 414. In step 410, the present engine speed NE and intake air amount GN are set as the engine speed NEsi and intake air amount GNsi obtained at the intermediate point of the intake valve open period for the No. i cylinder, after which the process proceeds to step 412. The processing from step 412 onward is the same as the processing from step 318 onward in the first embodiment.

Figure 18:
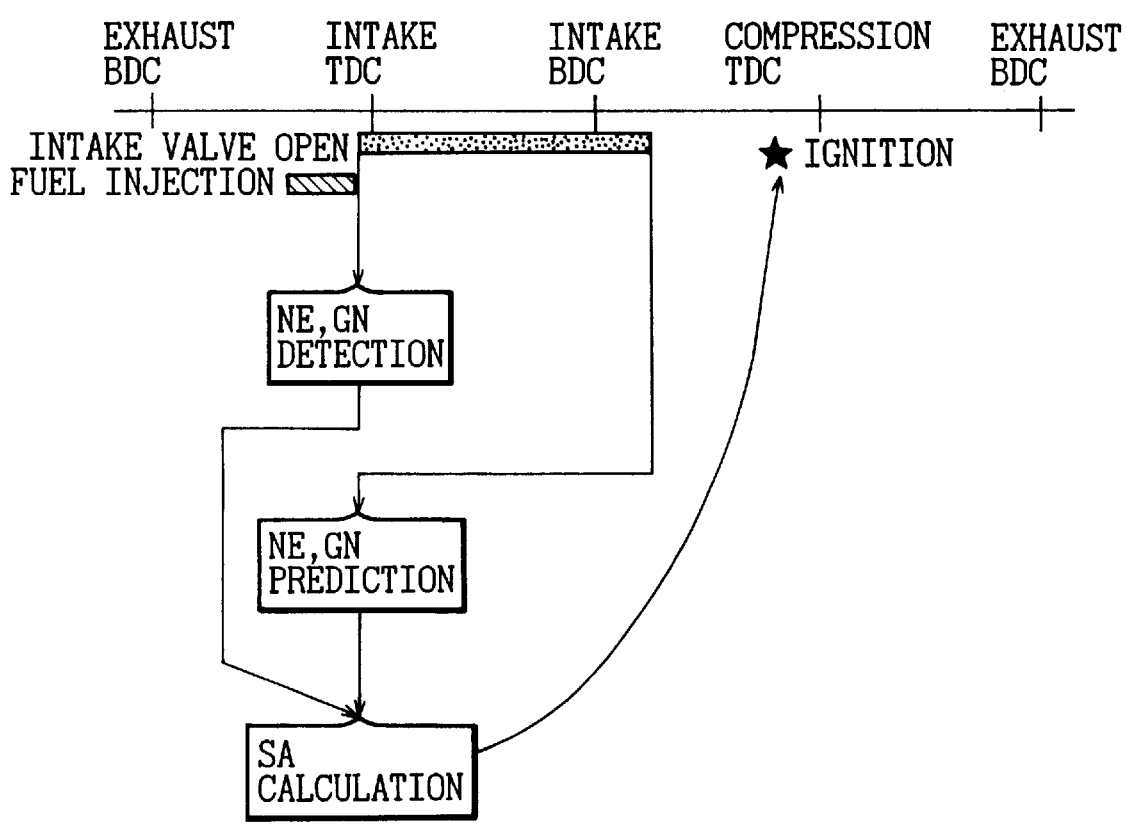
FIG. 18 is a diagram for explaining ignition timing control according to a third embodiment.

Next, the third embodiment will be described. In the third embodiment, as shown in FIG. 18, for each intake stroke of each cylinder the intake air amount GN and engine speed NE at the intake valve opening time are detected at the time that the intake valve is opened, and the intake air amount and engine speed at the intake valve closing time are predicted (preread) at the same time; then, the ignition timing SA is determined based on the average intake air amount and average engine speed calculated from the detected values and predicted values. That is, the third embodiment differs from the first embodiment only in that the intake air amount and engine speed at the intake valve closing time are predicted values, not detected values as in the first embodiment. Since the ignition timing can thus be determined earlier, the third embodiment offers the advantage that controllability can be maintained at high engine speeds. In the third embodiment, the timer interrupt service routine and Ne signal interrupt service routine used in the first embodiment are modified, and an NE and GN preread routine is added.

Figure 19:
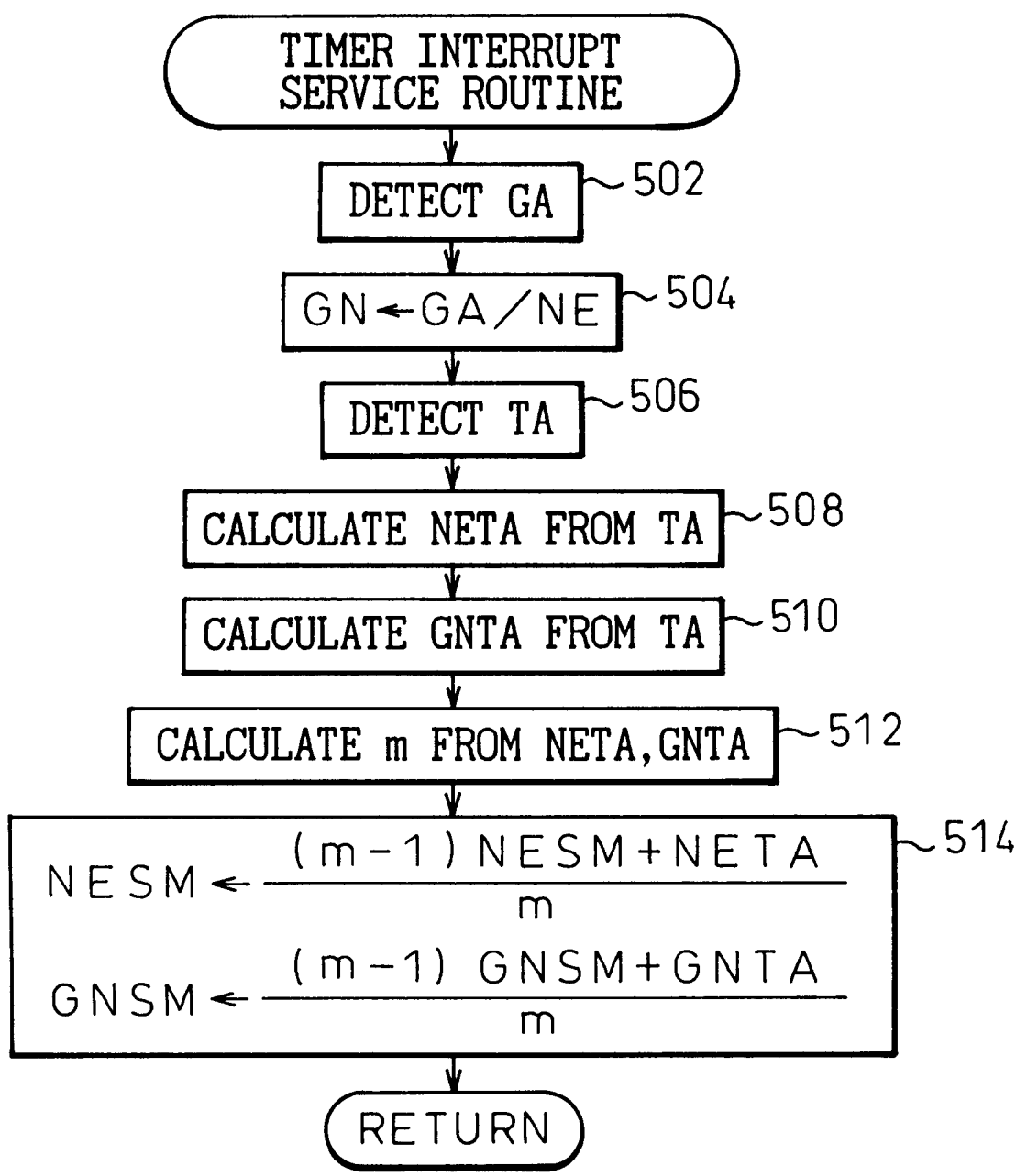
FIG. 19 is a flowchart illustrating a processing sequence for a timer interrupt service routine according to the third embodiment.
Figure 20:
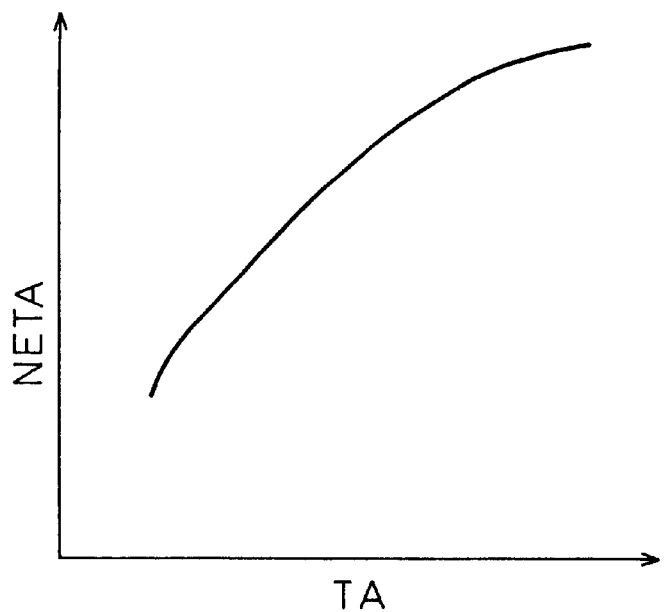
FIG. 20 is a diagram showing a map used to obtain engine speed NETA under steady-state operating conditions from throttle angle TA.
Figure 21:
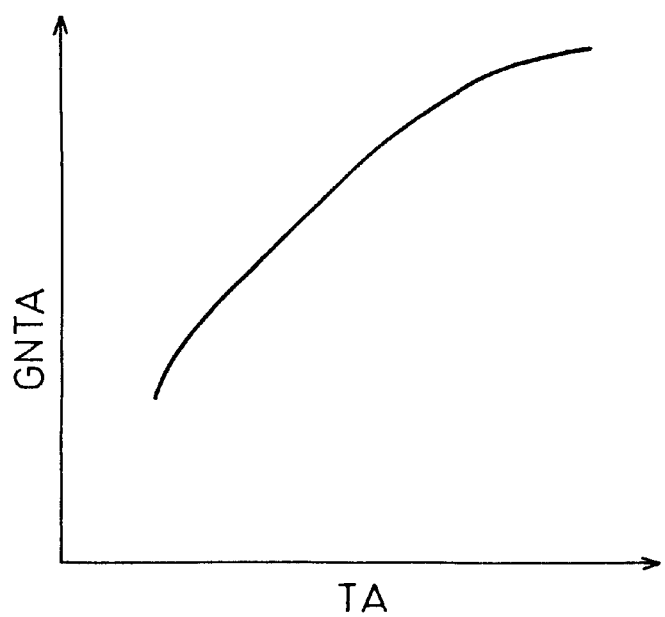
FIG. 21 is a diagram showing a map used to obtain intake air amount GNTA under steady-state operating conditions from throttle angle TA.

FIG. 19 is a flowchart illustrating a processing sequence for the timer interrupt service routine according to the third embodiment. First, in steps 502 and 504, the intake air flow rate GA is detected, and the intake air amount GN per engine revolution is calculated, in the same manner as in the timer interrupt service routine in the first embodiment. Next, in step 506, the opening angle TA of the throttle valve 5 is detected based on the output of the throttle angle sensor 42. In the next step 508, the engine speed NETA under the steady-state condition corresponding to the present throttle angle TA is calculated by referring to a map such as shown in FIG. 20. Further, in the next step 510, the intake air amount GNTA under the steady-state condition corresponding to the present throttle angle TA is calculated by referring to a map such as shown in FIG. 21.

Figure 22:
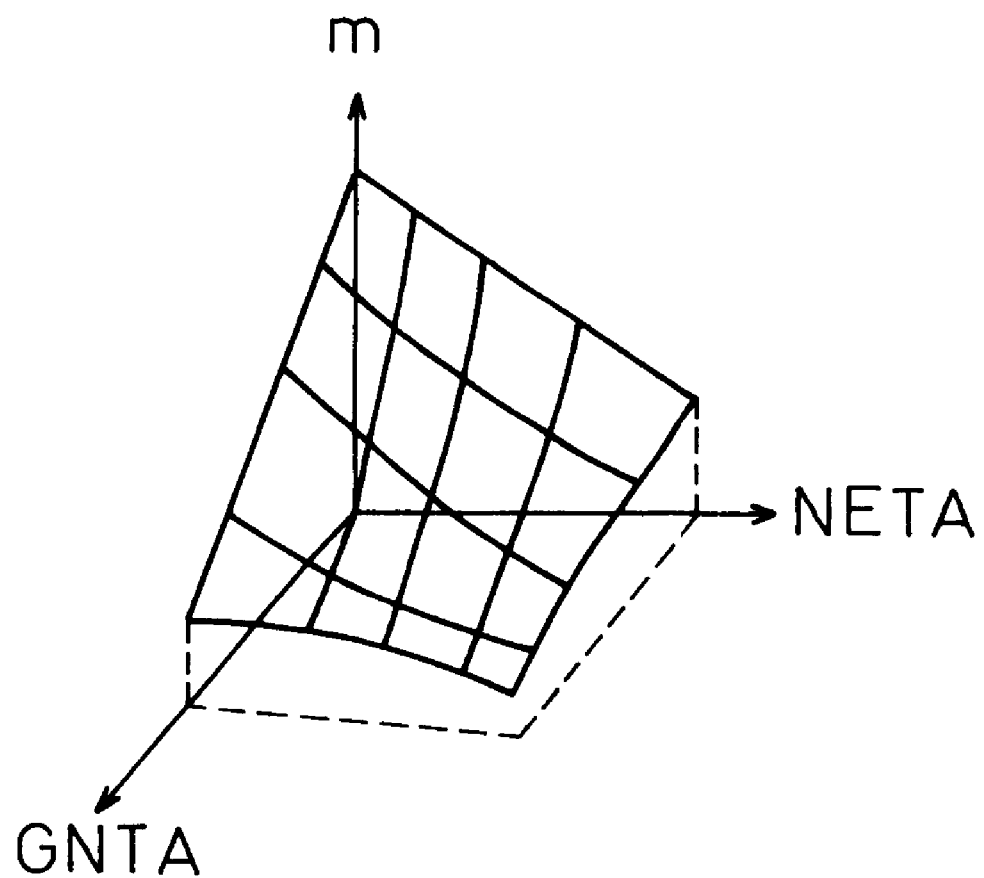
FIG. 22 is a diagram showing a map used to obtain weighted average factor m from NETA and GNTA.

Next, in step 512, a weighted average factor m for NETA and GNTA is calculated by referring to a map such as shown in FIG. 22. Lastly, in step 514, weighted average operations are performed on NETA and GNTA. That is, the weighted average values NESM and GNSM calculated up to the previous time are updated by the equations $$NESM \leftarrow NESM+(NETA-NESM)/m=[(m-1)NESM+NETA]/m$$

$$GNSM \leftarrow GNSM+(GNTA-GNSM)/m=[(m-1)GNSM+GNTA]/m$$

In the weighted average operations, the weighted average values up to the previous time are weighted by m−1 and the present calculated values by 1, and these values are weighted-averaged to obtain new weighted average values. The thus calculated NESM and GNSM are used in the NE and GN preread routine described later.

Figure 23A:
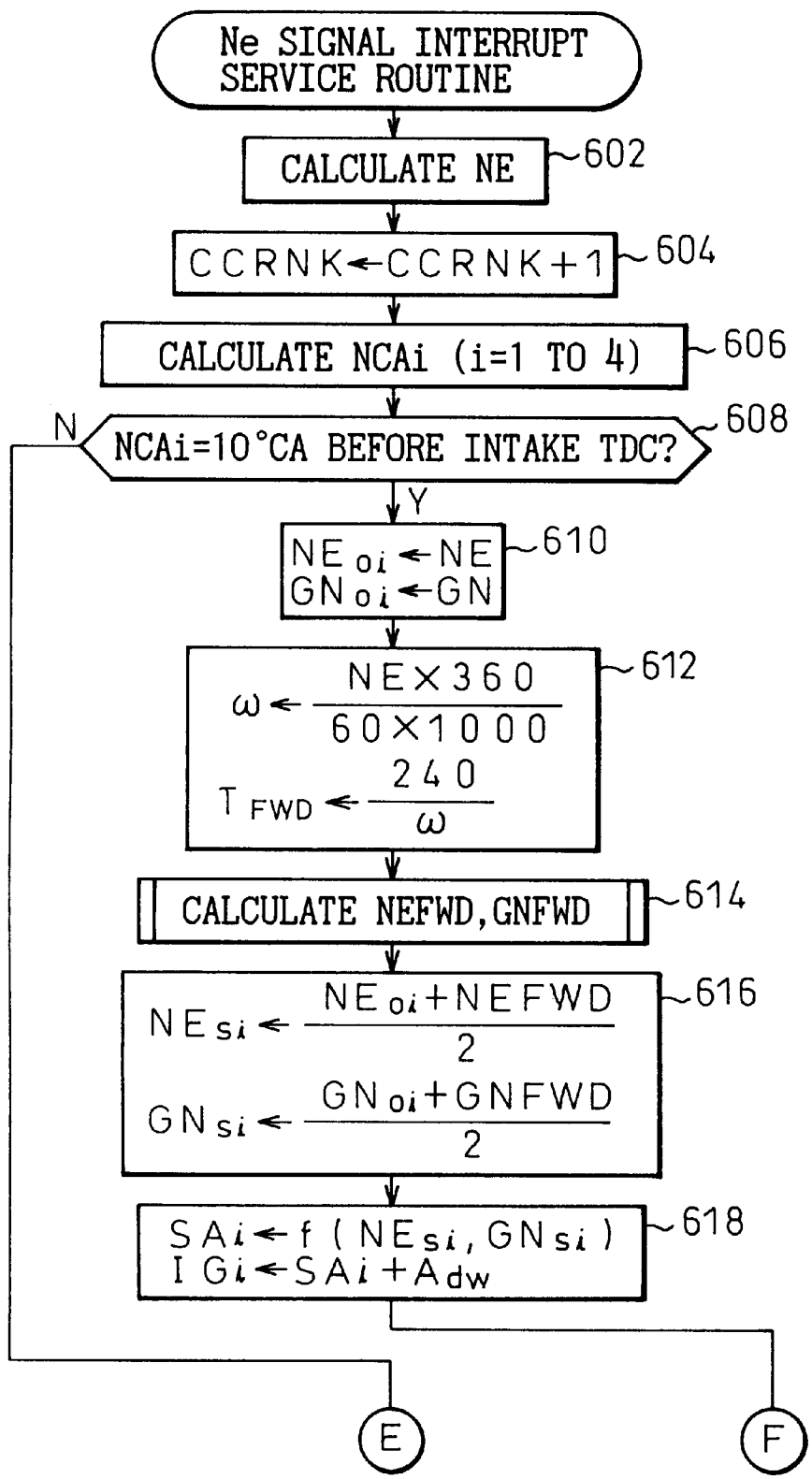
FIGS. 23A and 23B are diagrams showing a flowchart illustrating a processing sequence for an Ne signal interrupt service routine according to the third embodiment.
Figure 23B:
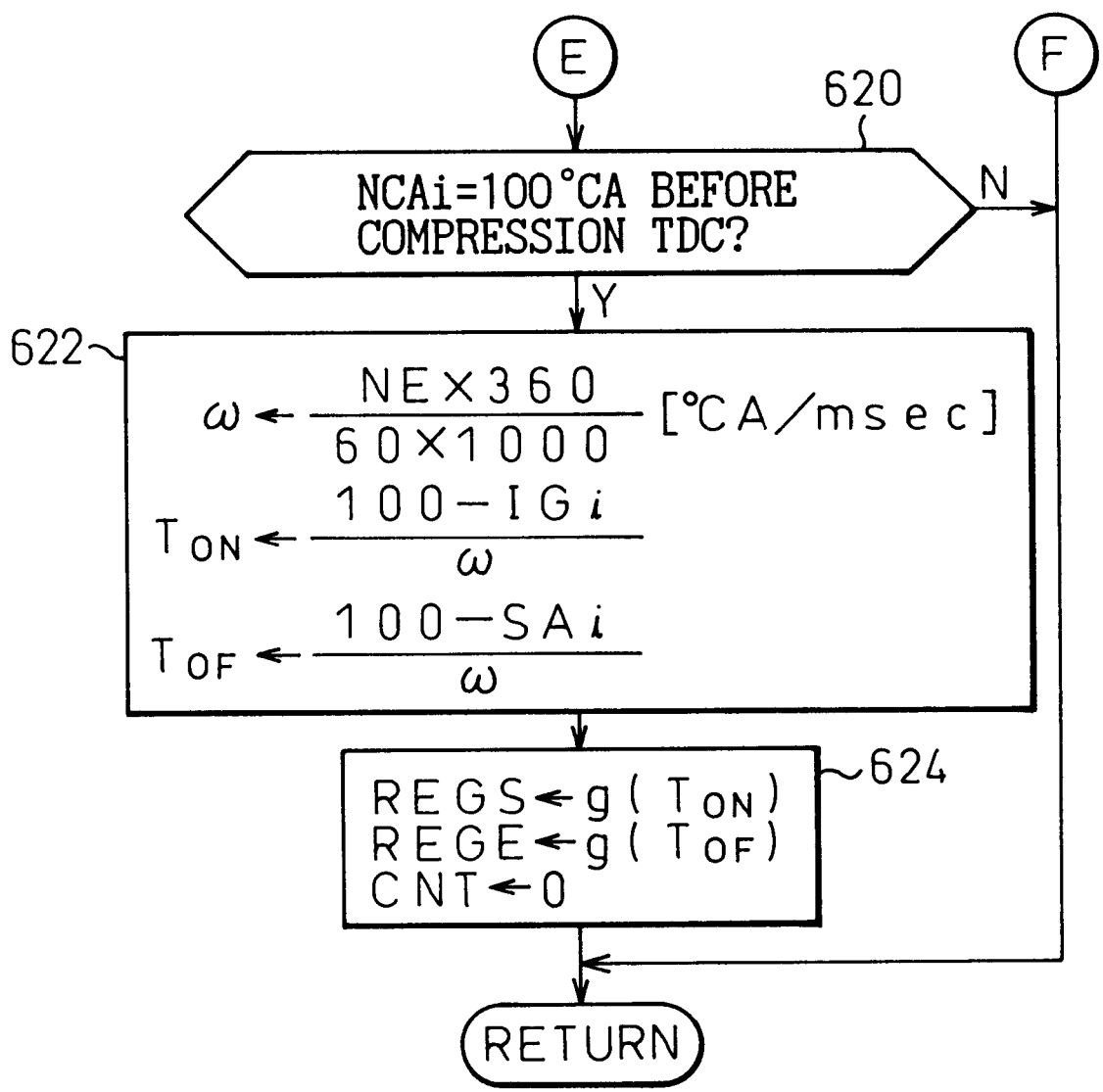

FIGS. 23A and 23B show a flowchart illustrating a processing sequence for the Ne signal interrupt service routine according to the third embodiment. First, in steps 602, 604, and 606, the present engine speed NE is calculated, the crankshaft angle calculation counter CCRNK is incremented, and the crankshaft angles NCAi (i=1, 2, 3, 4) are calculated for the respective cylinders, in the same manner as in steps 302, 304, and 306 in the Ne signal interrupt service routine according to the first embodiment.

Next, in step 608, a decision is made as to whether any one of the crankshaft angles NCAi is at 10° CA before intake top dead center; if the answer to the decision is YES, the process proceeds to step 610, but if the answer is NO, the process proceeds to step 620. In step 610, the present engine speed NE and intake air amount GN are stored as the engine speed NEoi and intake air amount GNoi obtained at the intake valve opening time for the No. i cylinder. Next, in step 612, the calculation $$\omega \leftarrow NE \times 360/60 \times 1000$$

is performed to calculate the angle of crankshaft rotation, ω, per millisecond. Further, the calculation $$T_{FWD} \leftarrow (10+180+50)/\omega = 240/\omega$$

is performed to calculate the time $T_{FWD}$ from the present time instant (10° CA before intake top dead center) to 50° CA after intake bottom dead center (near the intake valve closing time).

Next, in step 614, the NE and GN preread routine hereinafter described is called to calculate the engine speed NEFWD and intake air amount GNFWD expected at the end of the time $T_{FWD}$. Then, in step 616, the calculations $$NEsi \leftarrow (NEoi+NEFWD)/2$$

$$GNsi \leftarrow (GNoi+GNFWD)/2$$

are performed to calculate the respective average values. The processing from step 618 onward is the same as the processing from step 318 onward in the first embodiment.

Figure 24:
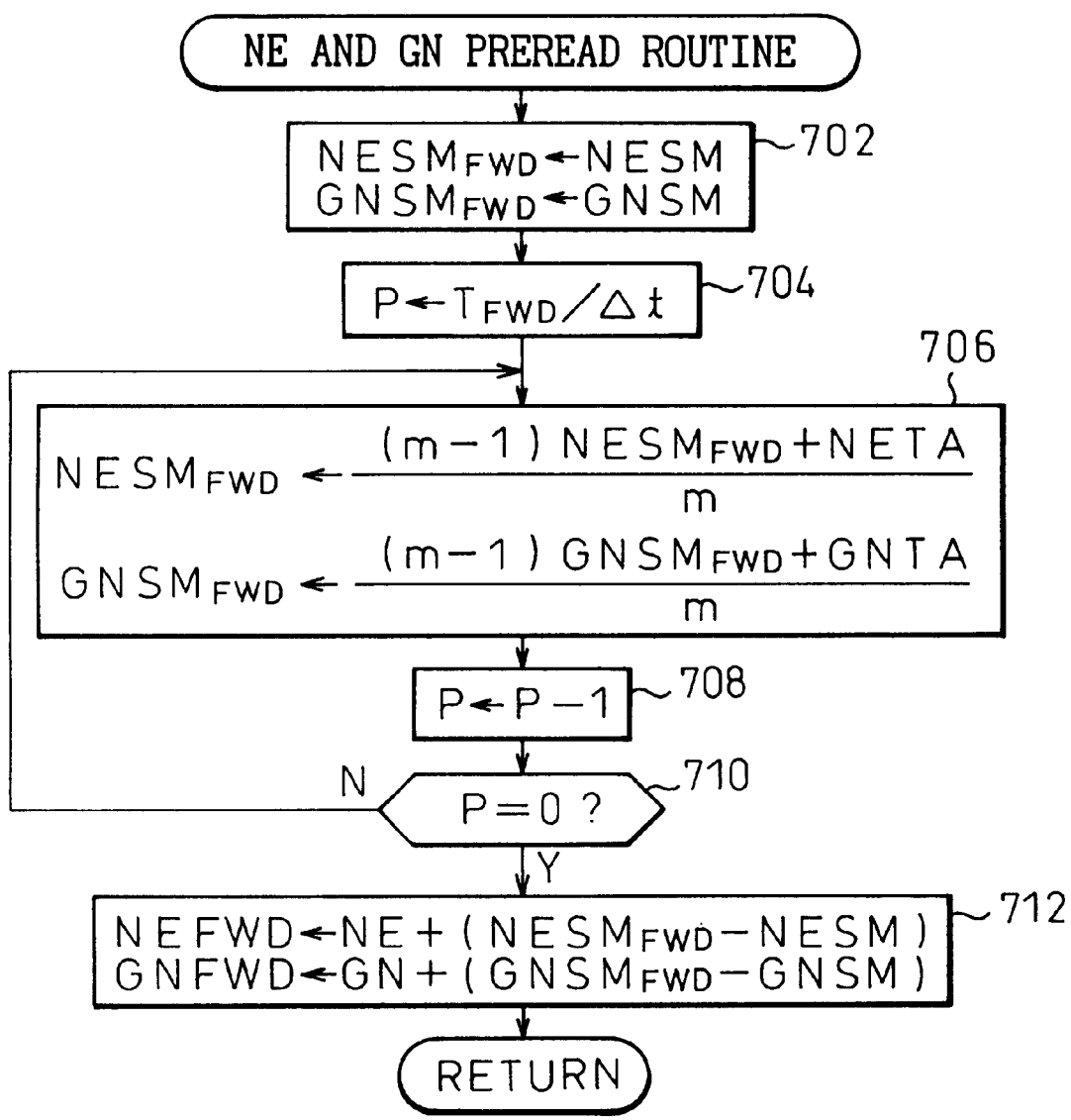
FIG. 24 is a flowchart illustrating a processing sequence for an NE and GN preread routine according to the third embodiment.

FIG. 24 is a flowchart illustrating a processing sequence for the NE and GN preread routine called in the above step 614. This routine takes over the weighted average operations performed in the timer interrupt service routine (FIG. 22). First, in step 702, the NESM and GNSM calculated in the timer interrupt service routine are set as $NESM_{FWD}$ and $GNSM_{FWD}$. Next, in step 704, the number of computations, P, is calculated by dividing the time $T_{FWD}$ from the present time instant to the prediction time by the execution cycle, Δt, of the timer interrupt service routine.

Next, in steps 706, 708, and 710, the following weighted average operations are repeated P times.

$$NESM_{FWD} \leftarrow [(m-1)NESM_{FWD}+NETA]/m$$

$$GNSM_{FWD} \leftarrow [(m-1)GNSM_{FWD}+GNTA]/m$$

By repeating the weighted average operations in this way, the most recent weighted average values approach the values that would be obtained at the steady-state condition; accordingly, by setting the number of weighted average computations in the above manner, approximations to the engine speed and intake air amount the time $T_{FWD}$ ahead of the present time instant (that is, the engine speed and air intake amount under conditions closer to the steady-state condition than the present time instant) can be obtained.

Lastly, in step 712, the calculations $$NEFWD \leftarrow NE+(NESM_{FWD}-NESM)$$

$$GNFWD \leftarrow GN+(GNSM_{FWD}-GNSM)$$

are performed to calculate the engine speed NEFWD and intake air amount GNFWD that would be obtained when the time $T_{FWD}$ elapsed from the present time instant. That is, the values $NESM_{FWD}$ and $GNSM_{FWD}$ at the prediction time are calculated, from which the values NESM and GNSM at the present time instant obtained by calculation are subtracted to obtain the differences; then, the differences are added to the current measured values NE and GN to obtain the predicted values NEFWD and GNFWD.

The fourth embodiment will be described next. In the fourth embodiment, as shown in FIG. 25, for each intake stroke of each cylinder the engine speed NE and intake air amount GN expected at the intermediate point of the intake valve open period are predicted (preread) at the intake valve opening time, and the ignition timing SA is determined based on the predicted intake air amount and engine speed. This contributes to reducing the computational burden compared to the third embodiment, and achieves a further improvement in controllability. The fourth embodiment differs from the third embodiment only in the Ne signal interrupt service routine.

Figure 26A:
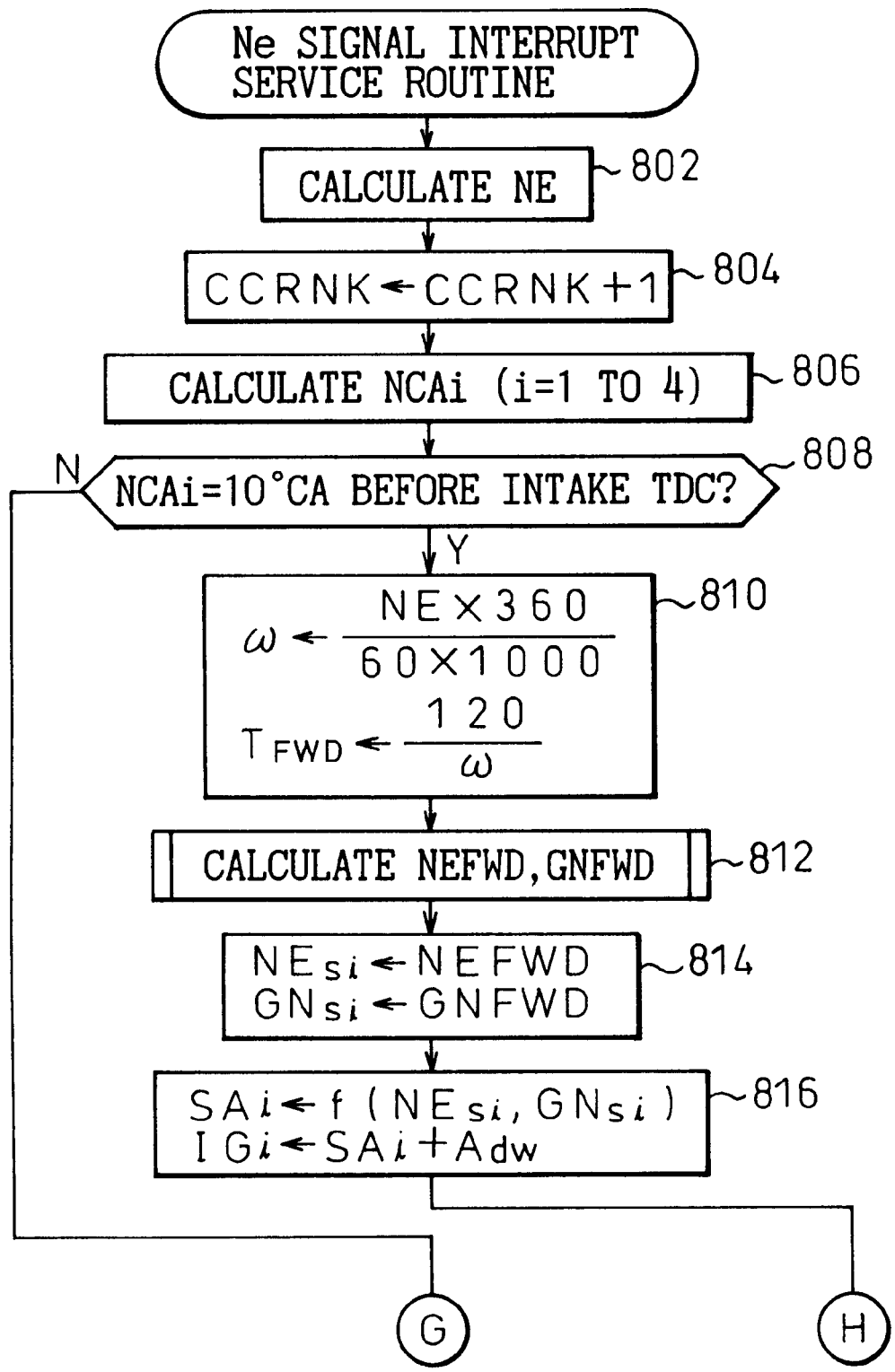
FIGS. 26A and 26B are diagrams showing a flowchart illustrating a processing sequence for an Ne signal interrupt service routine according to the fourth embodiment.
Figure 26B:
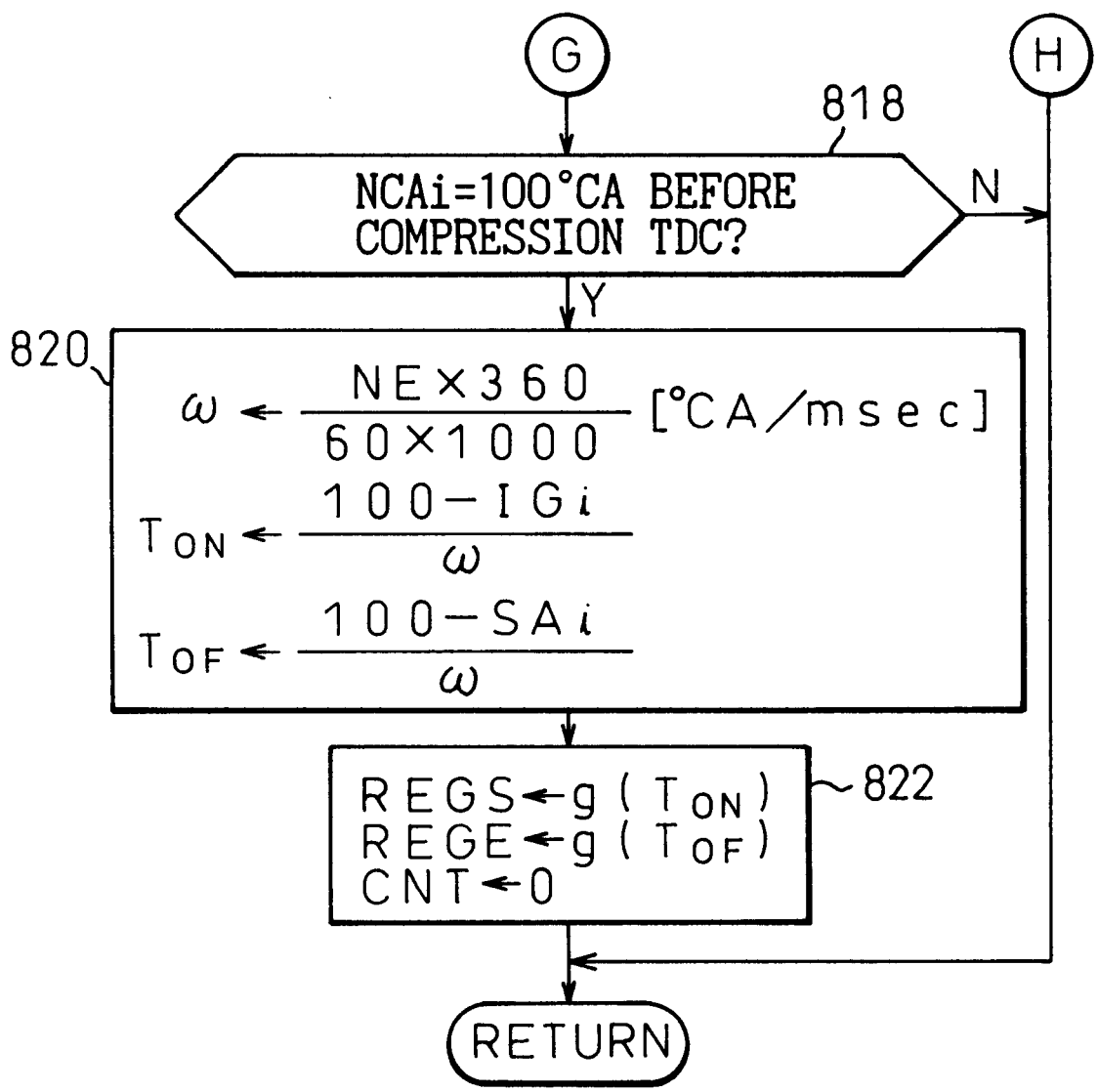

FIGS. 26A and 26B show a flowchart illustrating a processing sequence for the Ne signal interrupt service routine according to the fourth embodiment. First, in steps 802, 804, and 806, the present engine speed NE is calculated, the crankshaft angle calculation counter CCRNK is incremented, and the crankshaft angles NCAi (i=1, 2, 3, 4) are calculated for the respective cylinders, in the same manner as in steps 302, 304, and 306 in the Ne signal interrupt service routine according to the first embodiment.

Next, in step 808, a decision is made as to whether any one of the crankshaft angles NCAi is at 10° CA before intake top dead center; if the answer to the decision is YES, the process proceeds to step 810, but if the answer is NO, the process proceeds to step 818. In step 810, the calculation $$\omega \leftarrow NE \times 360/60 \times 1000$$

is performed to calculate the angle of crankshaft rotation, $\omega$, per millisecond. Further, the calculation $$T_{FWD} \leftarrow (10+110)/\omega = 120/\omega$$

is performed to calculate the time $T_{FWD}$ from the present time instant (10° CA before intake top dead center) to 110° CA after intake top dead center (the intermediate point of the intake valve open period).

Next, in step 812, the previously described NE and GN preread routine is called to calculate the engine speed NEFWD and intake air amount GNFWD expected at the end of the time $T_{FWD}$. Next, in step 814, the thus calculated NEFWD and GNFWD are set as the engine speed and intake air amount expected at the intermediate point of the intake valve open period for the No. i cylinder, that is, NEsi and GNsi which are used when referring to the ignition timing map. The process then proceeds to step 816. The processing from step 816 onward is the same as the processing from step 318 onward in the first embodiment.

As described above, according to the ignition timing control apparatus of the present invention, since the ignition timing for each combustion stroke of each cylinder is calculated on the basis of the intake air amount and engine speed during the intake stroke preceding the combustion stroke, the ignition timing can be set without causing deviations from the desired ignition timing even under transient engine operating conditions, thus achieving an improvement in output performance and preventing engine knock from occurring. In this way, the present invention contributes to further improving the drivability of an internal combustion engine.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An ignition timing control apparatus for an internal combustion engine, comprising:

intake air amount detection means for detecting the amount of intake air drawn into said engine;

engine speed detection means for detecting the rotational speed of said engine; and ignition timing setting means for determining, for each intake stroke of each cylinder of said engine, a representative intake air amount value and a representative engine speed value for an intake valve open period of said cylinder on the basis of the value of the intake air amount detected by said intake air amount detection means and the value of the engine speed detected by said engine speed detection means during said intake stroke preceding a combustion stroke, and for setting ignition timing for the combustion stroke associated with said intake stroke on the basis of said representative intake air amount value and said representative engine speed value.

2. An apparatus according to claim 1, wherein said representative intake air amount value is an average value taken between the intake air amounts at intake valve opening and closing times, and said representative engine speed value is an average value taken between the engine speeds at the intake valve opening and closing times.

3. An apparatus according to claim 1, wherein said representative intake air amount value represents the intake air amount at an intermediate point of said intake valve open period, and said representative engine speed value represents the engine speed at said intermediate point of said intake valve open period.

4. An apparatus according to claim 2, wherein the intake air amount and engine speed at said intake valve closing time are given as values predicted on the basis of the values of the intake air amount and engine speed previously detected by said intake air amount detection means and said engine speed detection means.

5. An apparatus according to claim 3, wherein the intake air amount and engine speed at said intermediate point of said intake valve open period are given as values predicted on the basis of the values of the intake air amount and engine speed previously detected by said intake air amount detection means and said engine speed detection means.

* * * * *